(12) United States Patent
Atchison et al.

(10) Patent No.: US 10,747,527 B2
(45) Date of Patent: Aug. 18, 2020

(54) MULTI-ZONE SYSTEM WITH SOFTWARE UPDATE FEATURES

(71) Applicant: Johnson Controls Technology Company, Auburn Hills, MI (US)

(72) Inventors: Shaun B. Atchison, Wichita, KS (US); Theresa N. Gillette, Wichita, KS (US); Jonathan A. Burns, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/983,645

(22) Filed: May 18, 2018

(65) Prior Publication Data

US 2018/0267794 A1    Sep. 20, 2018

Related U.S. Application Data

(63) Continuation-in-part of application No. 15/340,930, filed on Nov. 1, 2016.

(51) Int. Cl.
*G06F 9/44* (2018.01)
*G06F 8/656* (2018.01)
(Continued)

(52) U.S. Cl.
CPC .............. *G06F 8/656* (2018.02); *F24F 11/32* (2018.01); *F24F 11/49* (2018.01); *F24F 11/52* (2018.01); *F24F 11/58* (2018.01); *F24F 11/61* (2018.01); *G06F 8/65* (2013.01); *G06F 8/71* (2013.01); *G06F 9/445* (2013.01); *H04L 67/34* (2013.01); *G05B 19/0426* (2013.01); *G05B 2219/25011* (2013.01); *G06F 9/4411* (2013.01)

(58) Field of Classification Search
CPC ........................................................ G06F 8/65
See application file for complete search history.

(56) References Cited

U.S. PATENT DOCUMENTS 6,735,625 B1    5/2004    Ponna
7,055,759 B2    6/2006    Wacker et al.
(Continued)

OTHER PUBLICATIONS

Final Office Action on U.S. Appl. No. 15/340,930 dated Sep. 17, 2018. 11 pages.
(Continued)

*Primary Examiner* — Hang Pan
(74) *Attorney, Agent, or Firm* — Foley & Lardner LLP

(57) ABSTRACT

A system for performing software updates for building devices of a building includes a thermostat associated with one of multiple zones of the building and a controller. The controller includes a processing circuit configured to store thermostat software in a memory device of the processing circuit, the stored software being software for the thermostat and determine, by communicating with the thermostat, whether thermostat software run on the thermostat is newer or older than the thermostat software stored in the memory device. The processing circuit is configured to update the thermostat software run on the thermostat with the thermostat software stored in the memory device in response to a determination that the thermostat software run on the thermostat is older than the thermostat software stored in the memory device and operate building equipment to control an environmental condition of the building.

22 Claims, 13 Drawing Sheets

(51) Int. Cl.
| | | |
|---|---|---|
| *H04L 29/08* | (2006.01) | |
| *F24F 11/49* | (2018.01) | |
| *F24F 11/58* | (2018.01) | |
| *G06F 9/445* | (2018.01) | |
| *F24F 11/61* | (2018.01) | |
| *F24F 11/52* | (2018.01) | |
| *F24F 11/32* | (2018.01) | |
| *G06F 8/71* | (2018.01) | |
| *G06F 8/65* | (2018.01) | |
| *G05B 19/042* | (2006.01) | |
| *G06F 9/4401* | (2018.01) | |

(56) References Cited

U.S. PATENT DOCUMENTS

| | | |
|---|---|---|
| 7,076,536 B2 | 7/2006 | Chiloyan et al. |
| 7,083,109 B2 | 8/2006 | Pouchak |
| 7,222,800 B2 | 5/2007 | Wruck |
| 8,762,666 B2 | 6/2014 | Grohman et al. |
| 9,389,850 B2 | 7/2016 | Walter et al. |
| 9,804,901 B2 | 10/2017 | Gambardella et al. |
| 9,826,601 B2 | 11/2017 | Vangeel et al. |
| 9,870,222 B2 | 1/2018 | Sugimura |
| 9,879,873 B2 | 1/2018 | Malve et al. |
| 2001/0039590 A1 | 11/2001 | Furukawa et al. |
| 2002/0095672 A1* | 7/2002 | Evans ............... G06F 8/63 717/175 |
| 2005/0289467 A1* | 12/2005 | Imhof ............... G05B 15/02 715/734 |
| 2006/0037015 A1 | 2/2006 | Mihai |
| 2009/0261174 A1 | 10/2009 | Butler et al. |
| 2013/0219381 A1* | 8/2013 | Lovitt ............... G06F 8/65 717/173 |
| 2014/0207844 A1* | 7/2014 | Mayo ............... H04L 67/34 709/203 |
| 2015/0074658 A1* | 3/2015 | Gourlay ............. G05B 15/02 717/172 |
| 2015/0331688 A1* | 11/2015 | Shimizu ............. G06F 8/654 717/170 |
| 2015/0334165 A1 | 11/2015 | Arling et al. |
| 2016/0321061 A1 | 11/2016 | Walter et al. |
| 2017/0212487 A1 | 7/2017 | Gupta et al. |

OTHER PUBLICATIONS

Non-Final Office Action on U.S. Appl. No. 15/340,930 dated Jan. 29, 2019. 12 pages.

U.S. Office Action on U.S. Appl. No. 15/340,930 dated May 4, 2018. 14 pages.

\* cited by examiner

MULTI-ZONE SYSTEM WITH SOFTWARE UPDATE FEATURES

CROSS-REFERENCE TO RELATED PATENT APPLICATION

This application is a continuation-in-part of U.S. application Ser. No. 15/340,930 filed Nov. 1, 2016, the entirety of which is incorporated by reference herein.

BACKGROUND

The present disclosure relates generally to building efficiency systems and devices. The present disclosure relates more particularly to heating, ventilation, and air conditioning (HVAC) controls and thermostats.

Thermostats must have the proper software version installed in order to properly communicate with HVAC control devices. When new control devices are installed in a building, the thermostat may need to update to a particular software version in order to communicate with the HVAC control devices. The conventional method for updating software for a thermostat usually involves loading new software onto the thermostat through a storage devices such as an SD card or a USB flash drive.

SUMMARY

One implementation of the present disclosure is a thermostat for a building. The thermostat includes a communications interface communicably coupled to an HVAC network and a processing circuit. The processing circuit is configured to determine that an HVAC device is connected to the HVAC network. The processing circuit is further configured to retrieve a software update from the HVAC device via the communications interface and install the software update in response to a determination that a software update is needed in order to be configured to communicate with the HVAC device.

In some embodiments, the thermostat further includes a user interface configured to present information to a user and receive input from the user. In some embodiments, the processing circuit is configured to cause the user interface to display a message prompting the user to give permission to the thermostat to retrieve and install the software update from the HVAC device and retrieve and install the software update in response to a determination that the user gives the permission to the thermostat.

In some embodiments, the thermostat further includes a user interface configured to present information to a user and receive input from the user. The processing circuit is configured to cause the user interface to display a message prompting the user to call a service technician in response to a determination that the thermostat has failed to retrieve the software update from the HVAC device. The processing circuit is configured to receive the software update from a software update server via the communications interface and install the software update.

In some embodiments, the processing circuit is configured to determine that the software update can be retrieved from the HVAC device based on a network address of the HVAC device received via the communications interface. The thermostat may further include a database of network addresses associated with HVAC devices that can push software updates to the thermostat.

In some embodiments, the processing circuit is configured to determine if the software update can be retrieved from the HVAC device by searching the database with the network address.

In some embodiments, the processing circuit is configured to cause the communications interface to send configuration commands to the HVAC device in response to a determination that the software update has been successfully installed.

In some embodiments, the processing circuit is configured to generate control signals for the HVAC device. In some embodiments, the control signals cause the HVAC device to heat or cool the building to a setpoint and cause the communications interface to send the control signals to the HVAC device.

In some embodiments, the processing circuit is configured to determine that the HVAC device is connected to the HVAC network based on receiving, via the communications interface, an unrecognized network address.

In some embodiments, the processing circuit is configured to determine the software version necessary for communicating with the HVAC device by sending a message to a software update server via the HVAC network. The message may include an identifier associated with the HVAC device and a current software version of the thermostat.

Another implementation of the present disclosure is a method for updating software for a thermostat. The method includes determining, by a processor, that an HVAC device is connected to an HVAC network. The method includes determining, by the processor, a software version necessary for communicating with the HVAC device. The method includes retrieving, via the HVAC network, a software update corresponding to the software version from the HVAC device in response to a determination that the thermostat must install the software update in order to be configured to communicate with the HVAC device. The method further includes installing, via the processor, the software update in response to the determination that the thermostat must install the software update in order to be configured to communicate with the HVAC device.

In some embodiments, the method further includes causing a user interface to display a message prompting a user to give permission to the thermostat to retrieve the software update from the HVAC device and install the software update and retrieving the software update and installing the software update in response to a determination that the user gives the permission to the thermostat.

In some embodiments, the method includes causing the user interface to display a message prompting a user to call a service technician in response to a determination that the thermostat has failed to retrieve the software update from the HVAC device and receiving the software update from a software update server via a communications interface and installing the software update.

In some embodiments, the method further includes performing configuration steps for the HVAC device in response to a determination that the software update has been successfully installed.

In some embodiments, the method further includes generating control signals for the HVAC device, wherein the control signals cause the HVAC device to heat or cool the building to a setpoint and causing a communications interface to send the control signals to the HVAC device.

In some embodiments, determining that the HVAC device is connected to the HVAC network includes determining that an unrecognized network address is received via a communications interface.

Another implementation of the present disclosure is a master device for an HVAC network. The master device includes a communications interface communicably coupled to an HVAC network and a processing circuit. The processing circuit is configured to determine that an HVAC device is connected to the HVAC network. The processing circuit is configured to retrieve a software update from the HVAC device via the communications interface and install the software update in response to a determination that the master device must install the software update in order to be configured to communicate with the HVAC device. The processing circuit is configured to cause the communications interface to send configuration commands to the HVAC device in response to the determination that the master device has installed the software update in order to be configured to communicate with the HVAC device.

In some embodiments, the master device further includes a user interface configured to present information to a user and receive input from the user. The processing circuit may be configured to cause the user interface to display a message prompting the user to give permission to the master device to retrieve and install the software update from the HVAC device and retrieve and install the software update in response to a determination that the user gives the permission to the master device.

In some embodiments, the master device includes a user interface configured to present information to a user and receive input from the user. The processing circuit may be configured to cause the user interface to display a message prompting the user to call a service technician in response to the determination that the master device must install the software update in order to be configured to communicate with the HVAC device and receive the software update from a software update server via the communications interface and install the software update.

In some embodiments, the master device includes a user interface configured to present information to a user and receive input from the user. The processing circuit may be configured to cause the user interface to display a message prompting the user to call a service technician in response to the determination that the master device must install the software update in order to be configured to communicate with the HVAC device and receive the software update from a software update server via the communications interface and install the software update.

In some embodiments, the processing circuit is configured to determine that the software update can be retrieved from the HVAC device based on a network address of the HVAC device received via the communications interface. The master device may include a database of network address associated with HVAC devices that can push software updates to the master device.

Another implementation of the present disclosure is a system for performing software updates for building devices of a building having a plurality of zones. The system includes a zone device associated with one of the plurality of zones. The system includes a controller communicably connected to the zone device and building equipment configured to control an environmental condition of the building. The controller includes a processing circuit configured to store zone device software in a memory device of the processing circuit, the stored software being software for the zone device. The processing circuit is configured to determine, by communicating with the zone device, whether zone device software run on the zone device is newer or older than the zone device software stored in the memory device, update the zone device software run on the zone device with the zone device software stored in the memory device in response to a determination that the zone device software run on the zone device is older than the zone device software stored in the memory device, and operate the building equipment to control the environmental condition of the building.

In some embodiments, the processing circuit of the controller is configured to determine, by communicating with the zone device, whether the zone device software run on the zone device is newer or older than the zone device software stored in the memory device by retrieving a software version for the zone device software run on the zone device from the zone device, comparing the software version for the zone device software run on the zone device to a software version of the zone device software stored in the memory device, determining that the software run on the zone device is newer than the software stored in the memory device in response to a determination that a value of the software version for the zone device software run on the zone device is greater than a value of the software version of the zone device software stored in the memory device, and determining that the software run on the zone device is older than the software stored in the memory device in response to a determination that the value of the software version for the zone device software run on the zone device is less than the value of the software version of the zone device software stored in the memory device.

In some embodiments, the processing circuit of the controller is configured to retrieve the zone device software run by the zone device from the zone device in response to a determination that the zone device software run on the zone device is newer than the zone device software stored in the memory device and store the retrieved zone device software run by the zone device in the memory device to update the zone device software stored in the memory device.

In some embodiments, the system further includes a second zone device associated with another zone of the plurality of zones. In some embodiments, the processing circuit of the controller is configured to determine, by communicating with the second zone device, whether zone device software run on the second zone device is newer or older than the updated zone device software stored in the memory device and update the zone device software run on the second zone device in response to a determination that the zone device software run on the second zone device is older than the updated zone device software stored in the memory device.

In some embodiments, the zone device includes an network interface configured to communicate with a software update server and a processing circuit configured to receive, via the network interface, new zone device software from the software update server and update the zone device software run on the zone device with the new zone device software received from the software update server.

In some embodiments, the processing circuit of the zone device is configured to receive, via the network interface, new controller software for the controller from the software update server and send the new controller software to the controller. In some embodiments, the processing circuit of the controller is configured to receive the new controller software from the zone device and update controller software run on the controller with the received new controller software.

In some embodiments, the system further includes a second controller communicably coupled to the controller, wherein the second controller is configured to run controller software. In some embodiments, the processing circuit of the controller is configured to store controller software in the memory device of the processing circuit, the stored controller software being software for the controller and the second controller, determine, by communicating with the second controller, whether the software run on the second controller is newer or older than the software stored in the memory device, and update the software run on the second controller with the controller software stored in the memory device in response to a determination that the controller software run on the second controller is older than the controller software stored in the memory device.

In some embodiments, the processing circuit of the controller is configured to retrieve the controller software run by the second controller from the second controller in response to a determination that the software run on the second controller is newer than the controller software stored in the memory device and store the retrieved software run by the second controller in the memory device to update the controller software stored in the memory device.

In some embodiments, the processing circuit is configured to update the zone device software run on the zone device by determining whether there is a call for heating or cooling active for the building equipment, pausing the update until the call for heating or cooling is complete, operating the building equipment in a non-zone mode, wherein operating the building equipment in the non-zone mode causes the building equipment to control an environmental of each of the plurality of zones uniformly, and sending the zone device software stored in the memory device to the zone device.

In some embodiments, the processing circuit is configured to update the zone device software run on the zone device by further determining whether the software update is complete by communicating with the zone device, determining whether the call for heating or cooling is active for the system in response to a determination that the software update is complete, and operating the building equipment in a zone mode in response to a determination that the call for heating or cooling is complete, wherein operating the building equipment in the zone mode causes the building equipment to control the environmental condition of each of the plurality of zones based on an environmental setting associated with each of the plurality of the plurality of zones.

Another implementation of the present disclosure is a controller for performing software updates. The controller includes a processing circuit communicably coupled to a thermostat and building equipment. The processing circuit is configured to store thermostat software in a memory device of the processing circuit, the stored software being software for the thermostat, determine, by communicating with the thermostat, whether thermostat software run on the thermostat is newer or older than the thermostat software stored in the memory device, update the thermostat software run on the thermostat with the thermostat software stored in the memory device in response to a determination that the thermostat software run on the thermostat is older than the thermostat software stored in the memory device, and operate the building equipment to control an environmental condition of the building.

In some embodiments, the processing circuit is configured to determine, by communicating with the thermostat, whether the thermostat software run on the thermostat is newer or older than the thermostat software stored in the memory device by retrieving a software version for the thermostat software run on the thermostat from the thermostat, comparing the software version for the thermostat software run on the thermostat to a software version of the thermostat software stored in the memory device, determining that the software run on the thermostat is newer than the software stored in the memory device in response to a determination that a value of the software version for the thermostat software run on the thermostat is greater than a value of the software version of the thermostat software stored in the memory device, and determining that the software run on the thermostat is older than the software stored in the memory device in response to a determination that the value of the software version for the thermostat software run on the thermostat is less than the value of the software version of the thermostat software stored in the memory device.

In some embodiments, the processing circuit of the controller is configured to retrieve the thermostat software run by the thermostat from the thermostat in response to a determination that the thermostat software run on the thermostat is newer than the thermostat software stored in the memory device and store the retrieved thermostat software run by the thermostat in the memory device to update the thermostat software stored in the memory device.

In some embodiments, the processing circuit of the controller is configured to determine, by communicating with a second thermostat, whether thermostat software run on the second thermostat is newer or older than the updated thermostat software stored in the memory device and update the thermostat software run on the second thermostat in response to a determination that the thermostat software run on the second thermostat is older than the updated thermostat software stored in the memory device.

In some embodiments, the processing circuit of the controller is configured to store controller software in the memory device of the processing circuit, the stored controller software being software for the controller and a second controller, determine, by communicating with the second controller, whether the software run on the second controller is newer or older than the software stored in the memory device, and update the software run on the second controller with the controller software stored in the memory device in response to a determination that the controller software run on the second controller is older than the controller software stored in the memory device.

In some embodiments, the processing circuit of the controller is configured to retrieve the controller software run by the second controller from the second controller in response to a determination that the software run on the second controller is newer than the controller software stored in the memory device and store the retrieved software run by the second controller in the memory device to update the controller software stored in the memory device.

In some embodiments, the processing circuit is configured to update the thermostat software run on the thermostat by determining whether there is a call for heating or cooling active for the building equipment, pausing the update until the call for heating or cooling is complete, operating the building equipment in a non-zone mode, wherein operating the building equipment in the non-zone mode causes the building equipment to control an environmental of each of a plurality of zones of the building uniformly, and sending the thermostat software stored in the memory device to the thermostat.

In some embodiments, the processing circuit is configured to update the thermostat software run on the thermostat by further determining whether the software update is complete by communicating with the thermostat, determining whether the call for heating or cooling is active for the system in response to a determination that the software update is complete, and operating the building equipment in a zone mode in response to a determination that the call for heating or cooling is complete, wherein operating the building equipment in the zone mode causes the building equipment to control the environmental condition of each of the plurality zones of the building based on an environmental setting associated with each of the plurality of zones.

Another implementation of the present disclosure is a method for performing software updates. The method includes storing, by one or more processing circuits of a controller, thermostat software in a memory device of the one or more processing circuits, the stored software being software for a thermostat, determining, by the one or more processing circuits of the controller by communicating with the thermostat, whether thermostat software run on the thermostat is newer or older than the thermostat software stored in the memory device, and updating, by the one or more processing circuits of the controller, the thermostat software run on the thermostat with the thermostat software stored in the memory device in response to a determination that the thermostat software run on the thermostat is older than the thermostat software stored in the memory device. The method includes retrieving, by the one or more processing circuits of the controller, the thermostat software run by the thermostat from the thermostat in response to a determination that the thermostat software run on the thermostat is newer than the thermostat software stored in the memory device, storing, by the one or more processing circuits of the controller, the retrieved thermostat software run by the thermostat in the memory device to update the thermostat software stored in the memory device, and operating, by the one or more processing circuits of the controller, building equipment to control an environmental condition of a building.

In some embodiments, the method includes determining, by the one or more processing circuits of the controller by communicating with a second thermostat, whether thermostat software run on the second thermostat is newer or older than the updated thermostat software stored in the memory device and updating, by the one or more processing circuits of the controller, the thermostat software run on the second thermostat in response to a determination that the thermostat software run on the second thermostat is older than the updated thermostat software stored in the memory device.

BRIEF DESCRIPTION OF THE DRAWINGS

The exemplary embodiments will become more fully understood from the following detailed description, appended claims and the accompany drawings, which are briefly described below and wherein like numerals denote like elements:

DETAILED DESCRIPTION

Overview

Referring generally to the FIGURES, systems and methods for updating the software of a thermostat based on software stored on an HVAC device is shown, according to various exemplary embodiments. In some embodiments, when an HVAC device is first installed in a building and connected to an HVAC network, the thermostat may communicate with the HVAC device and determine the proper steps for configuring the HVAC device. In some embodiments, the thermostat recognizes the new HVAC device and determines that the thermostat has the correct firmware to configure the new HVAC device and performs the configuration without updating the software of the thermostat.

In some embodiments, the thermostat requests and/or is pushed a software update directly from the HVAC device. The thermostat may send the request to the new HVAC device in response to a determination that the thermostat does not have the proper software to communicate with and/or control the HVAC device. The HVAC controls may send the software update over a network and/or directly to the thermostat. The thermostat may install the software update and configure the HVAC device based on the new software. In various embodiments, the thermostat may determine that the HVAC device does not store the appropriate software update. The thermostat can communicate with a network server and request the proper software update be transmitted via a network connect. In various embodiments, a technician may cause the networks server to push a software update to the thermostat. The thermostat can install the software update from the server and can then configure the HVAC device based on the software update received from the server. In some embodiments, the software update necessary for communicating with the HVAC controls cannot be retrieved directly from the HVAC device and/or the network server. The thermostat may be configured to prompt a user to manually install (e.g., via an SD card, via a USB driver, etc.) a certain software update necessary for communicating with the HVAC device.

Building Management System and HVAC System

Figure 1:
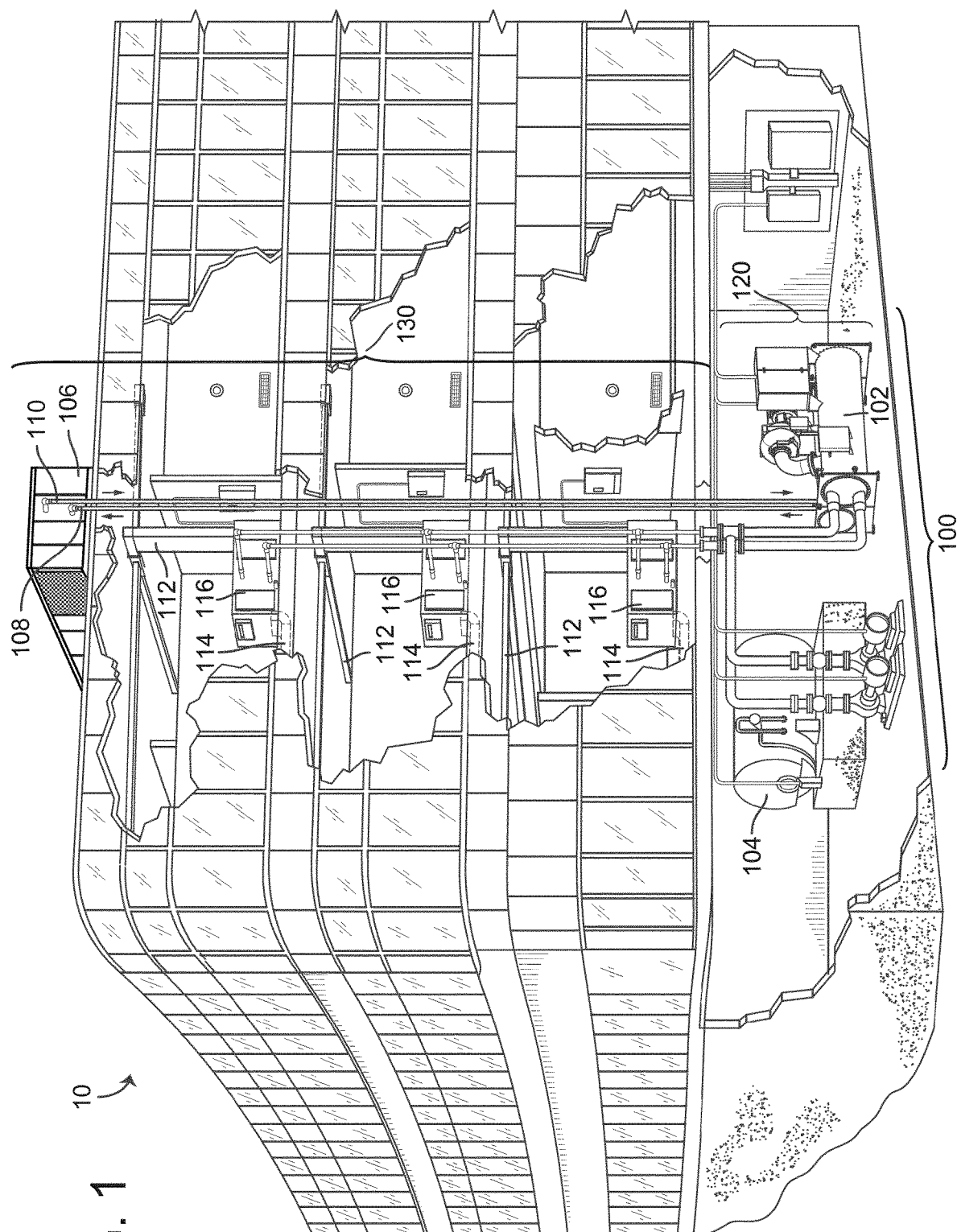
FIG. 1 is a schematic drawing of a building equipped with an HVAC system, according to an exemplary embodiment.
Figure 2:
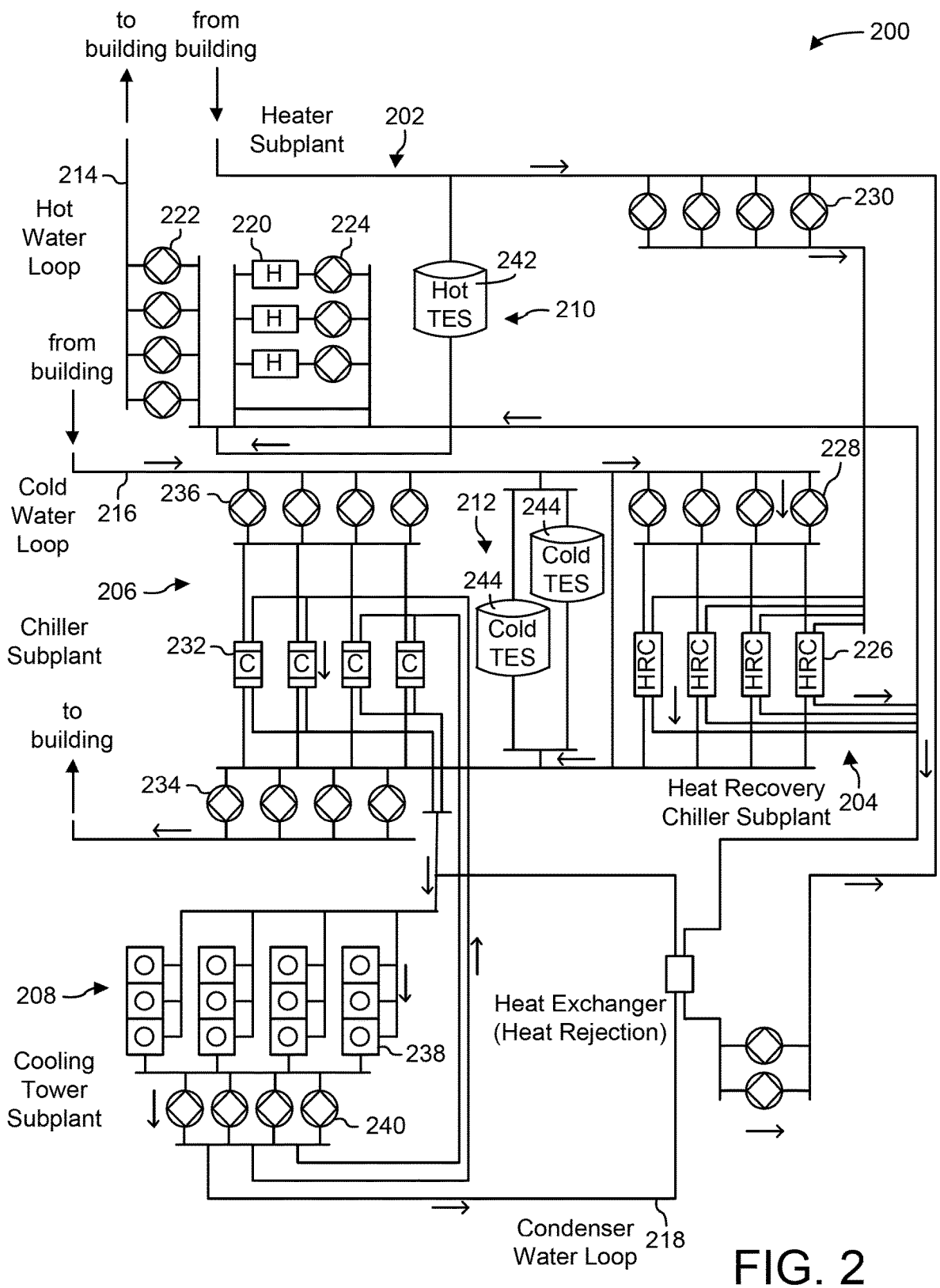
FIG. 2 is a block diagram of a waterside system that may be used in conjunction with the building of FIG. 1, according to an exemplary embodiment.
Figure 3:
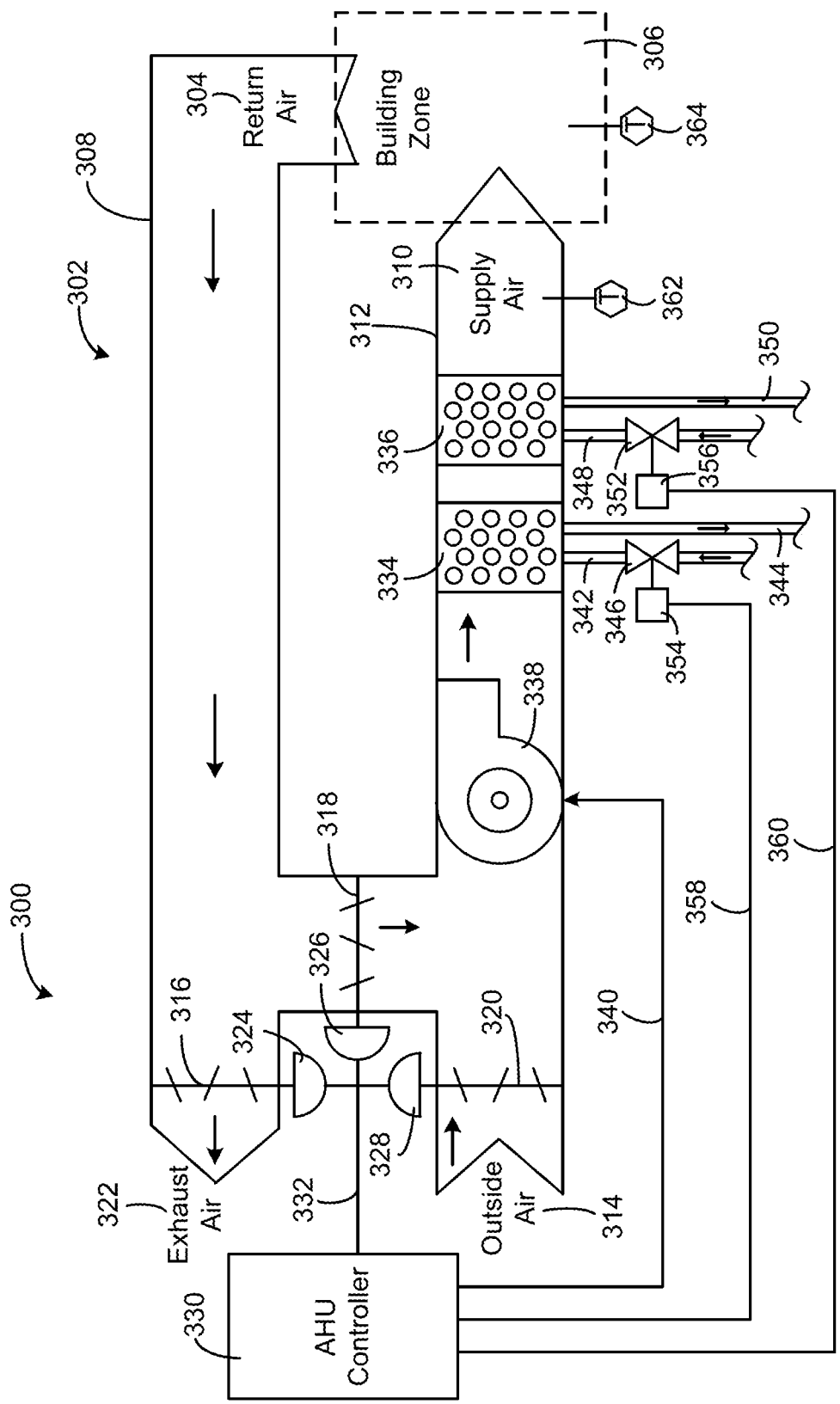
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, N2, BACnet, BACnet MS/TP etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Systems and Methods for Thermostat Software Updates

Figure 4:
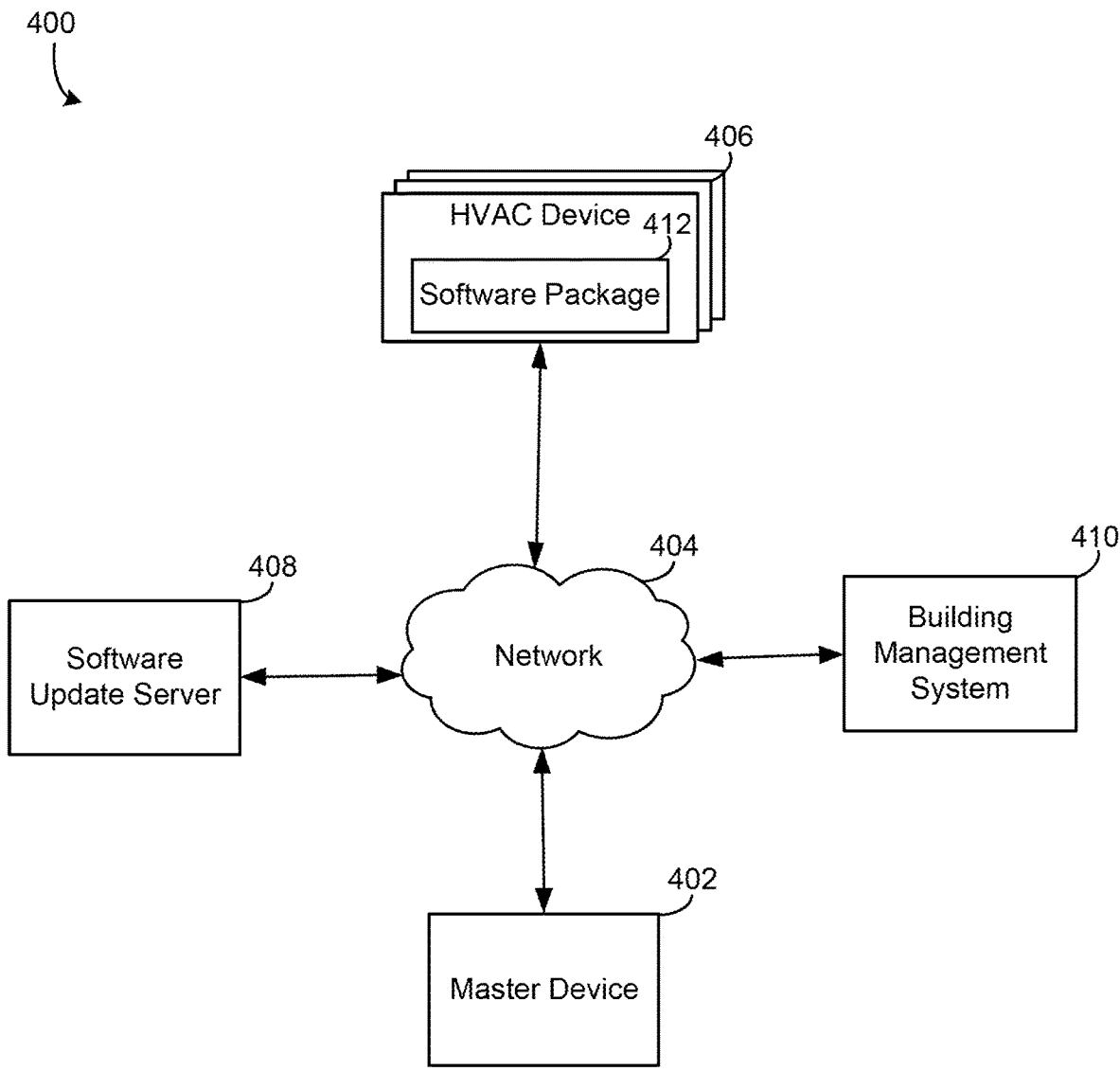
FIG. 4 is a diagram of a communications system located in the building of FIG. 1, according to an exemplary embodiment.

Referring now to FIG. 4, a block diagram of communications system 400 is shown, according to an exemplary embodiment. System 400 can be implemented inside and/or outside a building (e.g. building 10) and is shown to include a master device 402, a network 404, HVAC device(s) 406, a software update server 408, and a building management system 410. In some embodiments, master device 402 is a thermostat, an HVAC controller, a smart actuator, a smart heater, a smart damper, an RTU, a chiller, an AHU, and/or any other HVAC device. In some embodiments, master device 402 is configured to generate control commands for HVAC device(s) 406 and send the commands to the HVAC device(s) 406 via network 404. In some embodiments, the control commands cause environmental conditions of a building (e.g., building 10) to be controlled to environmental setpoints (e.g., temperature setpoint, humidity setpoint, etc.)

In some embodiments, network 404 is at least one of and/or a combination of a Wi-Fi network, a wired Ethernet network, a Zigbee network, and a Bluetooth network. In some embodiments, network 404 is an HVAC network. In various embodiments, the HVAC network operates with a proprietary communication protocol. Network 302 may be a local area network or a wide area network (e.g., the Internet, a building WAN, etc.) and may use a variety of communications protocols (e.g., N2, BACnet, BACnet MS/TP, IP, LON, etc.) In various embodiments, the communications protocols may be physically implemented over RS-485, RS-232, RS-422, PS/2, USB, fire wire, Ethernet, etc. Network 404 may include routers, cables, network switches, connectors, wireless repeaters, radio modules, and/or any other component necessary for implementing wireless and/or wired communication.

HVAC device 406 can be a smart actuator. The smart actuator may be a damper actuator, a pneumatic actuator, a threaded ball valve, and/or any other kind of actuator. HVAC device(s) 406 can be sensors. The sensors may be carbon dioxide sensors, humidity sensors, occupancy sensors, pressure sensors, temperature sensors, network sensors, and/or any other type of sensor. HVAC device 406 can be a variable speed drive, a variable air volume (VAV) systems, a roof top unit (RTU), a thermostat, an AHU, an AC system, a controller, and/or any other device and/or system. In some embodiments, HVAC device(s) 406 are indoor control devices and/or systems and/or outdoor control devices and/or systems. In FIG. 4, HVAC device 406 can store software package 412 and/or a plurality of software packages. Software package 412 may contain all necessary information for master device 402 to communicate with and/or operate HVAC device 406. In various embodiments, software package 412 is an operating system for master device 402 and/or any other software package and/or update for master device 402. In some embodiments, HVAC device 406 may be configured to transmit software package 412 or a portion of software package 412 (i.e., a software patch, software plugin, etc.) to master device 402. In some embodiments, master device 402 must retrieve and install software package 412 before it can control and/or communicate with HVAC device 406.

Software update server 408 may communicate with HVAC device(s) 406, master device 402, and building management system 410. Software update server 408 can update software package 412 and/or can update software for master device 402. In various embodiments, a technician may cause software update server 408 to push a software update to master device 402. For example, a customer may place a call to the technician requesting that the software on their thermostat (e.g., master device 402) be updated. The technician may cause software update server 408 to push a software update to the thermostat via network 404.

In some embodiments, master device 402 can send a request to software update server 408 for a specific software update. Software update server 408 may respond by pushing the specific software update to master device 402. In various embodiments, master device 402 can send a request for an unknown software version needed to control and/or communicate with a particular HVAC device (e.g., HVAC device 406). In some embodiments, software update server 408 can determine the appropriate software version for master device 402 based on the identity of the HVAC device 406. Software update server 408 may push the software to master device 402. Master device 402 may install the software update pushed from software update server 408.

Building management system 410 may be configured to communicate with master device 402 via network 404. Building management system 410 may be configured to adjust heating and/or cooling to the building of FIG. 1 and/or control the lighting of the building of FIG. 1 by generating control signals for HVAC device(s) 406. In some embodiments, building management system 410 receives zone and/or building control information (e.g., data, control signals, temperatures, humidities, etc.) from master device 402. The control information may be an environmental setpoint such as a temperature setpoint and/or a humidity setpoint. Further, the control information may be a lighting control signal and/or any other facility control signal.

Figure 5:
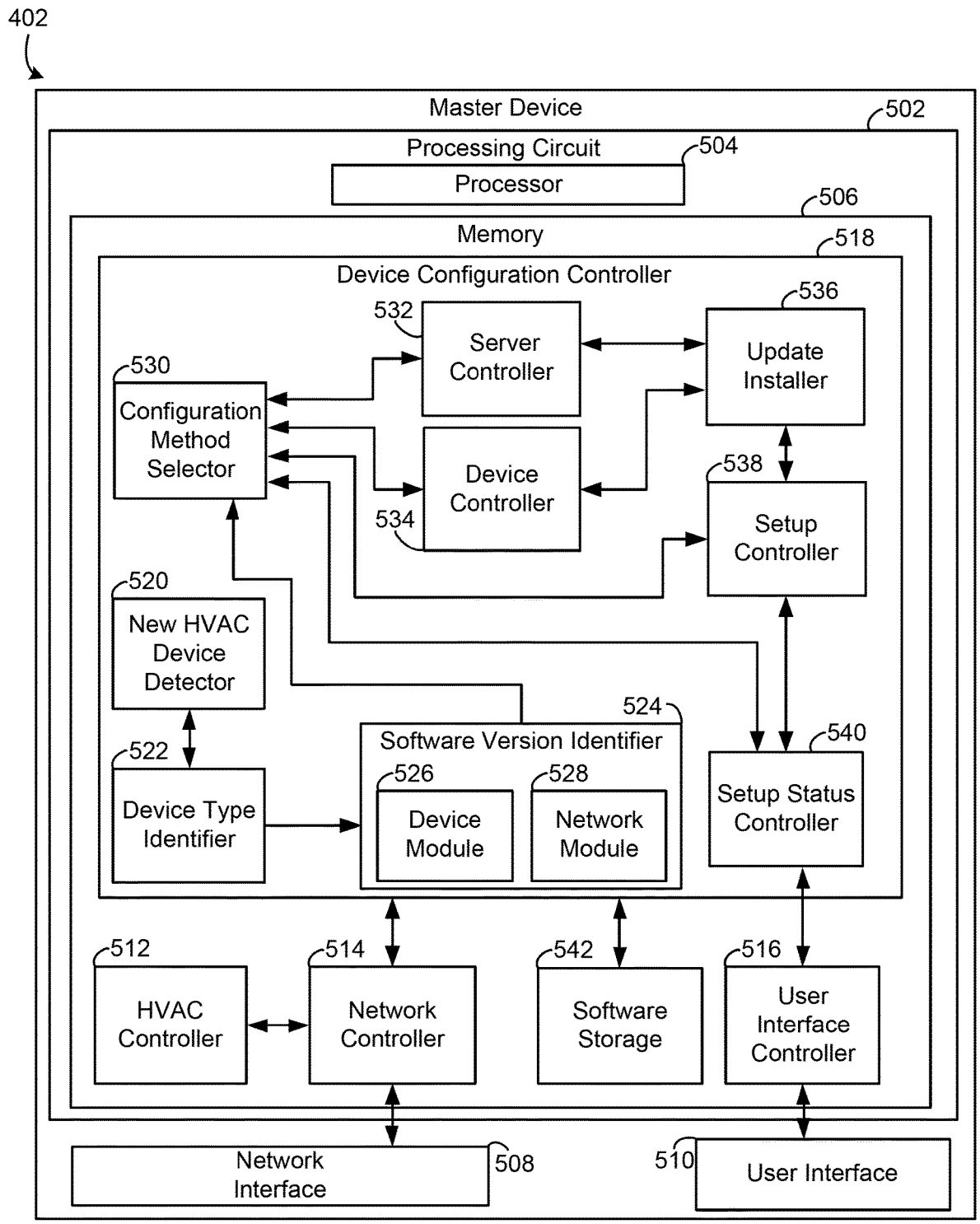
FIG. 5 is a diagram of the master device of FIG. 4 in greater detail, according to an exemplary embodiment.

Referring now to FIG. 5, a block diagram illustrating master device 402 in greater detail is shown, according to an exemplary embodiment. Master device 402 is shown to include a processing circuit 502. Master device may also include a network interface 508 and a user interface 510. Processing circuit 502 is shown to include a processor 504 and memory 506. Processor 504 can be a general purpose or specific purpose processor, an application specific integrated circuit (ASIC), one or more field programmable gate arrays (FPGAs), a group of processing components, or other suitable processing components. Processor 504 may be configured to execute computer code or instructions stored in memory 506 or received from other computer readable media (e.g., CDROM, network storage, a remote server, etc.).

Memory 506 can include one or more devices (e.g., memory units, memory devices, storage devices, etc.) for storing data and/or computer code for completing and/or facilitating the various processes described in the present disclosure. Memory 506 can include random access memory (RAM), read-only memory (ROM), hard drive storage, temporary storage, non-volatile memory, flash memory, optical memory, or any other suitable memory for storing software objects and/or computer instructions. Memory 506 can include database components, object code components, script components, or any other type of information structure for supporting the various activities and information structures described in the present disclosure. Memory 506 can be communicably connected to processor 504 via processing circuit 502 and can include computer code for executing (e.g., by processor 504) one or more processes described herein.

Memory 506 can include an HVAC controller 512, a network controller 514, a user interface controller 516, and a device configuration controller 518. In some embodiments, HVAC controller 512 provides a control signal to HVAC device(s) 406 via network controller 418 and/or network interface 508. The control signal may cause the HVAC device(s) 406 to condition and/or heat a zone and/or building to a setpoint temperature. Further, the control signals may cause HVAC device(s) 406 to achieve a humidity value in a building and/or zone based on a humidity setpoint.

Network controller 514 may contain instructions to communicate with a network (e.g., network 404). In some embodiments, network controller 514 contains instructions to communicate over a wireless network Wi-Fi network, a Zigbee network, and/or a Bluetooth network via network interface 508. Network controller 514 may be able to facilitate communication a local area network or a wide area network (e.g., the Internet, a building WAN, etc.). In some embodiments, network controller 514 may communicate over a wired means and may use a variety of communications protocols (e.g., N2, BACnet, IP, LON, RS-485, RS-232 etc.). Network controller 514 may be configured to communicate over any kind of network.

User interface controller 516 is configured to display icons, images, and text on user interface 510. In some embodiments, user interface controller 516 is configured to display a prompt to a user via user interface 510. In some embodiments, the prompt identifies a software update version and/or software patch number necessary to communicate with HVAC device(s) 406. In some embodiments, the user interface controller 516 may display a button to a user via user interface 510. Pressing the button may cause the network controller 514 to send a request to software update server 408 as described with reference to FIG. 4 for a software update. In various embodiments, user interface 510 is a touch screen display. User interface 510 may be one or a combination of a resistive touch screen device, a capacitive touch screen device, a projective capacitive touch screen device, and/or any other display screen and/or touch input device. In some embodiments, user interface has physical buttons such as push buttons, dials, knobs and/or any other physical button. User interface controller 516 may monitor the status and/or value of each button, dial, knob, and/or physical button.

Device configuration controller 518 may be configured to communicate with software update server 408 and HVAC device(s) 406 via network controller 514, network interface 508, and network 404. In some embodiments, device configuration controller 518 may be configured to run setup operations on HVAC device(s) 406 and/or receive software updates from HVAC device(s) 406 and/or software update server 408 when HVAC device(s) 406 are physically installed by a technician on network 404.

Device configuration controller 518 includes new HVAC device detector 520. New HVAC device detector 520 may be configured to monitor activity on network 404 via network controller 514 and network interface 508. New HVAC device detector 520 may be configured to identify a new device (e.g., HVAC device 406) installed in a building (e.g., building 10) that is communicating over network 404. In some embodiments, new HVAC device detector 520 is configured to detect HVAC device(s) 406 by determining that a new address is being used to communicate over network 404. In some embodiments, the address is a MAC address, an IP address, a MS/TP address, a device name (i.e., an identifier), and/or any other address. In various embodiments, new HVAC device detector 520 determines that the new device has been installed by determining that the address associated and/or broadcast by the new device is unrecognized and/or otherwise unknown to master device 402. In various embodiments, the address is associated with a device that has not yet been configured and/or paired with master device 402.

Device configuration controller 518 may include device type identifier 522. Device type identifier 522 may be configured to determine a device type of a newly installed HVAC device (e.g., HVAC device 406). In some embodiments, the device type may be determined by the device address. In some embodiments, device type identifier 522 includes a database of device addresses. In some embodiments, each device address is linked to a software version. In various embodiments, the database of device addresses indicates what devices (e.g., HVAC device(s) 406) master device 402 is configured to communicate with. In some embodiments, device type identifier 522 is configured to determine the type of device installed on network 404. For example, device type identifier 522 may be configured to determine if the device is a pneumatic actuator, an indoor control device and/or system, an outdoor control device and/or system, a temperature sensor, etc. Device configuration controller 518 may send a command to an HVAC device (e.g., HVAC device(s) 406) requesting that a device identifier be sent to the master device 402. The master device 402 may send the identifier to software update server 408 where the HVAC device 406 can be identified. The software update server 408 may reply to device configuration controller 518 with the identity of the newly install HVAC device.

In various embodiments, the database of device type identifier 522 is used to determine if the newly installed HVAC device is configured to push a software update to the master device 402. In some embodiments, the database includes a list of addresses associated with devices (e.g., HVAC device 406) that are configured to push software updates to master device 402. In some embodiments, device type identifier 522 may tell configuration method selector to retrieve or to not retrieve a software update from the new device based on searching the database. If the search results in a determination that the newly identified address is associated with a device that can push a software update to master device 402, configuration method selector 530 may be configured to retrieve the software update from the newly installed device. If the search results in a determination that the newly identified address is not associated with a device that can push a software update to master device 402, configuration method selector 530 can attempt a different software update method.

Software version identifier 524 may be configured to determine the software version necessary for communicating with an HVAC device 406. In various embodiments, software version identifier 524 is configured to receive a software version from a newly installed HVAC device (e.g., HVAC device 406). Software version identifier 524 may be configured to query HVAC device 406 for the identity of the required software and/or may query network 404 for the identifier of the required software. Software version identifier 524 may include a device module 526 and a network module 528. In some embodiments device module 526 may be configured to send a query to HVAC device 406. In some embodiments, HVAC device 406 may reply with the identity of the necessary software version needed for communicating with HVAC device 406. In various embodiments, device module 526 may allow HVAC device 406 to access the current software and/or firmware (e.g., software storage 542) so that HVAC device 406 can determine the correct and/or compatible software update. In some embodiments, the HVAC device (e.g., HVAC device 406) may automatically push a software version identifier to master device 402 via network 404. In some embodiments, the device module 526 may identify if the software currently being run on master device 402 is correct, may determine that a software patch is needed for communicating with the HVAC device(s) 406, and/or may determine that a complete software update is needed for the master device 402.

In some embodiments, software version identifier 524 may include network module 528. In some embodiments, network module 528 may send the identity of the device determined by device type identifier 522 to the building management system 410 and/or the software update server 408. The identity sent may be accompanied by a request for the software version necessary for communicating with the HVAC device(s) 406.

Master device 402 may include configuration method selector 530. In some embodiments, configuration method selector 530 may be configured to select between using the currently installed software on master device 402 to communicate with and/or setup (i.e., pair, configure, etc.) the HVAC device(s) 406, retrieve a software update and/or software patch from the HVAC device(s) 406, and/or retrieve the software update and/or software patch from the software update server 408.

In some embodiments, configuration method selector 530 may be configured to attempt sequential methods for communicating and configuring the HVAC device(s) 406. In some embodiments, configuration method selector 530 may first attempt to setup the HVAC device(s) 406 if configuration method selector 530 has identified that master device 402 has the correct software for communicating with and configuring the HVAC device(s) 406. In some embodiments, configuration method selector 530 determines that master device 402 has the correct software based on determining that the address associated with HVAC device 406 is an address known and/or stored in a database on configuration method selector 530. In some embodiments, the configuration method selector 530 will next attempt to retrieve the necessary software and/or software patch directly from the HVAC device(s) 406. In some embodiments, the configuration method selector 530 will attempt to retrieve the necessary software and/or software patch needed to communicate with the HVAC device(s) 406 from software update server 408 if the master device 402 cannot retrieve the necessary software and/or software patch from the HVAC device(s) 406. In various embodiments, configuration method selector 530 will receive a command from software update server 408 that a software update is being pushed to master device 402. Configuration method selector 530 may cause the software update to be installed. In various embodiments, configuration method selector 530 may receive an install command from a newly installed HVAC device (e.g., HVAC device(s) 406) and/or may be pushed a software version (e.g., software package 412). In some embodiments, the newly installed HVAC device (e.g., HVAC device(s) 406) may be configured request a software version identifier from configuration method selector 530. Configuration method selector may reply with the software version identifier.

Server controller 532 may be configured to communicate with software update server 408 via network controller 514, network interface 508, and/or network 404. In some embodiments, server controller 532 is configured to receive a software update (e.g., a software update file, a software update patch, etc.) pushed from software update server 408. In some embodiments, server controller 532 may be configured to send a request to software update server 408 for a software update and/or a software patch when HVAC device 406 is identified by new HVAC device detector 520. In some embodiments, server controller 532 may send at least one of the identity of the HVAC device 406, the address with which the HVAC device 406 communicates with, a current software version of master device 402, and/or a request for known software update package and/or patch. In some embodiments, the software update server 408 replies to the server controller 532 with the software update package and/or patch based on the requested software update package and/or patch.

In some embodiments, server controller 532 may be configured to determine the necessary software version based on the identity of HVAC device 406, the address with which the HVAC device 406 communicates, and/or the current software version of master device 402. In some embodiments, the server controller 532 receives the software version and/or patch and causes update installer 536 to install the software update and/or patch.

In some embodiments, device controller 534 is pushed a software version installation message from HVAC device 406. In some embodiments, the message identifies that HVAC device 406 does not have the correct software to communicate with HVAC device 406. The message may contain a profile (e.g., software name, software number, etc.) of the software to be installed. In various embodiments, device controller 534 sends the required software version identifier to HVAC device 406 via network 404. If HVAC device 406 has the software version necessary for communicating with device controller 534, HVAC device 406 may push the correct software package (e.g., software package 412). Device controller 534 can be configured to send a software request directly to the HVAC device 406. The software request may be sent in response to a user indicating the software be updated via user interface 510. In some embodiments, the request may be sent by network controller 514 via network interface 508 and network 404. In some embodiments, HVAC device 406 replies by sending software package 412 to device controller 534. Software package 412 may be a software update (e.g., a new software package) and/or a software patch that can be installed on and/or modify the current software on master device 402. Device controller 534 may cause update installer 536 to install software package 412.

Update installer 536 can be configured to install new software packages and/or software patches (e.g., software package 412). In some embodiments, update installer 536 causes the master device 402 to reboot and install the new software and/or software patch. In some embodiments, update installer 536 may cause master device 402 to install the software in the background while master device 402 is booted (i.e., running). Update installer 536 may be configured to cause user interface controller 516 to display an install message on user interface 510. The install message may prompt a user to install the software package and/or patch. If the user does not press a button causing the master device 402 to install the software package and/or patch, the update installer 536 may wait a predefined amount of time before automatically beginning installation of the software package and/or patch. In some embodiments, the amount of time is displayed on user interface 510 as a countdown.

Setup controller 538 can be configured to setup an HVAC device (e.g., HVAC device 406). In some embodiments, setup new HVAC device controller may setup the HVAC device when configuration method selector 530 determines that no software update and/or patch (e.g., software package 412) is needed. Setting up HVAC device may include mapping BACnet MS/TP and/or N2 points. In some embodiments, master device 402 maps the BACnet and/or N2 points of the HVAC device. In various embodiments, setup controller 538 maps only the points necessary for operating the HVAC device.

Setting up the HVAC device with setup controller 538 may include selecting a communications address for the HVAC device. In various embodiments, the address may be IP addresses, BACnet addresses, N2 addresses, and/or any other address or identifier. In some embodiments, setup controller 538 may communicate with the HVAC device to verify that it is operating properly. Setup controller 538 may test points, read and/or write registers, send test commands, and/or any other action which may identify that the HVAC device is operating and setup correctly. In some embodiments, setup controller 538 may cause user interface controller 516 to display a message on user interface 510 that the HVAC device has been properly installed and/or has been properly configured.

Setup status controller 540 may be configured to monitor the setup steps of HVAC devices (e.g., HVAC device 406). In various embodiments, setup status controller 540 may cause user interface controller 516 to display step by step confirmation of the installation and setup of HVAC devices (e.g., HVAC device 406) on user interface 510. In some embodiments, setup status controller 540 may monitor the progress of updating software for master device 402. Setup status controller 540 can be configured to cause user interface controller 516 to display a message on user interface 510 indicating the method used to update the software (i.e., software retrieved from server update server 408 or software retrieved from HVAC device 406). In various embodiments, setup status controller 540 may present a message received from HVAC device 406 to a user via user interface 510. The message may instruct the user of master device 402 to retrieve s software update (e.g., software package 412) from HVAC device 406.

In some embodiments, setup status controller 540 causes user interface controller 516 to display a message on user interface 510 that the software cannot be retrieved from software update server 408 and/or HVAC device 406. The message may identify the software version necessary for communicating with HVAC device 406. In some embodiments, the message includes a web address to search for and download the correct software version. In various embodiments, the message includes a phone number of a technician.

In some embodiments, memory 506 includes software storage 542. In various embodiments, software storage 542 stores firmware and/or an operating system. In some embodiments, software storage 542 is a software package and/or code for master device 402. Software storage 542 may be configured to execute commands on processor 504. In various embodiments, device configuration controller 518, HVAC controller 512, network controller 514, and user interface controller 516 are stored in software storage 542. Software storage 542 may be configured to receive new software from update installer 536. In some embodiments, update installer 536 installs software updates received from software update server 408 and/or HVAC device 406 and installs the software updates in software storage 542. In some embodiments, software storage 542 is RAM, ROM, EPROM, EEPROM, CD-ROM or other optical disk storage, magnetic disk storage or other magnetic storage devices.

Figure 6:
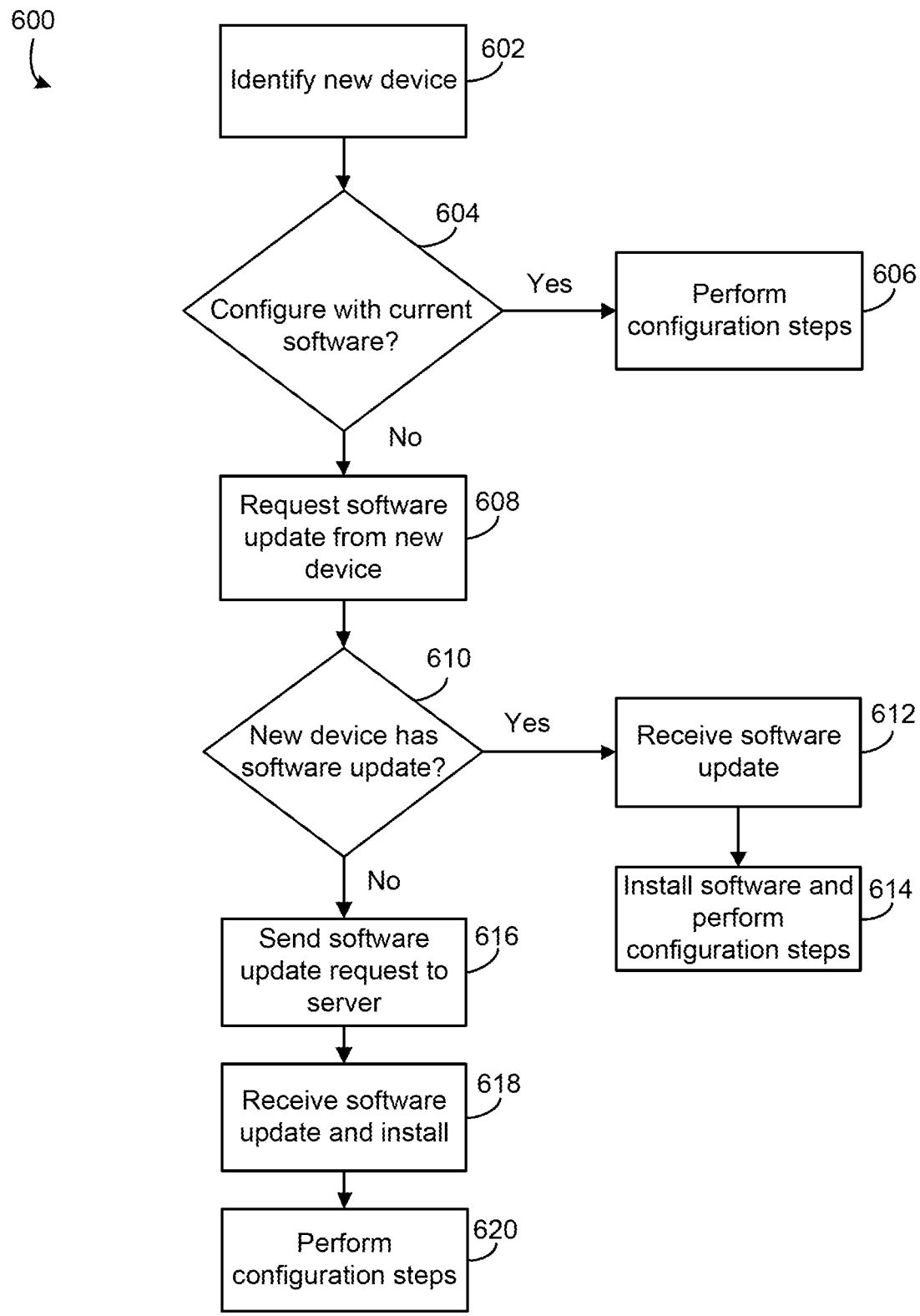
FIG. 6 is a flow diagram illustrating a process for updating software for the master device of FIGS. 4-5 and configuring the HVAC device of FIG. 4, according to an exemplary embodiment.

Referring now to FIG. 6, a flow diagram of process 600 for installing software updates on a device is shown, according to an exemplary embodiment. In some embodiments, process 600 is performed by master device 402, as described with reference to FIGS. 4-5. In step 602, the master device 402 determines that a new device (e.g., HVAC device 406) has been connected to network 404 or has otherwise been communicably coupled with master device 402. In some embodiments, master device 402 determines that a new device has been connected by identifying a new address being broadcast over network 404 and/or to master device 402.

In step 604, master device 402 determines if the master device 402 can configure the new device based on the current software and/or setup variables stored on master device 402. If the master device 402 has the correct software and/or setup variables, master device 402 performs configuration steps (step 606). Step 606 may include mapping points of the new device, sending test data to the new device, and/or any other configuration and/or testing action.

If master device 402 determines that master device 402 does not have the correct software and/or setup variables, master device 402 performs step 608. In step 608, master device 402 sends a request to the new device for a software update. In some embodiments, the master device 402 may determine what version of the software is necessary for communicating with the new device. In various embodiments, master device 402 sends the software version needed to communicate with the new device to the new device. In some embodiments, the new HVAC device automatically pushes the software update to master device 402. In some embodiments, the new HVAC device first determines the necessary software version and/or update by sending an information request to master device 402. The information request may be a request for the current software on master device 402, an identifier of master device 402, and/or any other information.

In step 610, master device 402 determines if the software update can be received from the new device. If master device 402 determines that the software update can be received from the new device, the master device 402 performs step 612. In some embodiments, determining that the software update can be received includes receiving a confirmation from the new device. The confirmation may include a message indicating that the new device is configured to perform the update process and includes the correct software for master device 402. In some embodiments, step 612 may include displaying a message on a user interface (e.g., user interface 516) of master device 402 with a user prompt to retrieve and/or install the new software.

In step 612, master device 402 receives the software update from the new device. In some embodiments, the software update is a complete software package and/or a software patch (e.g., software package 412). In various embodiments, the software update is a plugin and/or other software module that can be installed specifically for setting up and communicating with the new device. In step 614, master device 402 installs the new software and configures the new device. Step 614 may include mapping points of the new device, sending test data to the new device, and/or any other configuration and/or testing action.

If master device 402 cannot receive a software update from the new device, master device 402 sends a software request to a software update server (e.g., software update server 408) (step 616). In some embodiments, the request includes the necessary software version, software patch, and/or software plugin. In various embodiments, the request includes the current software version for the master device 402. The request may also include the address of the new device and a request that the software update server identify the software version necessary. In various embodiments, the software update server identifies the software version based on the address of the new device and the current software on the master device 402. In some embodiments, step 616 includes displaying a phone number for a technician. The technician may be able to push software via network 404 to master device 402 via a software update server.

In step 618, master device 402 receives the software update from software update server 408 and installs the software. In various embodiments, the software update has been requested by master device 402. In various embodiments, the software update is pushed to master device 402 without a request from master device 402. Installing the software may cause the master device 402 to reboot and install the new software and/or software patch during a boot cycle. In some embodiments, the software update may be installed in the background while master device 402 is running. In some embodiments, installing the software update includes causing an install message to be displayed on user interface 510. The install message may prompt a user to install the software package and/or patch. If the user does not press a button causing the master device 402 to install the software package and/or patch, master device 402 may wait a predefined amount of time before installing the software package and/or patch. In some embodiments, the amount of time is displayed on user interface 510 as a countdown. Step 620 may include mapping points of the new device, sending test data to the new device, and/or any other configuration and/or testing action.

Figure 7:
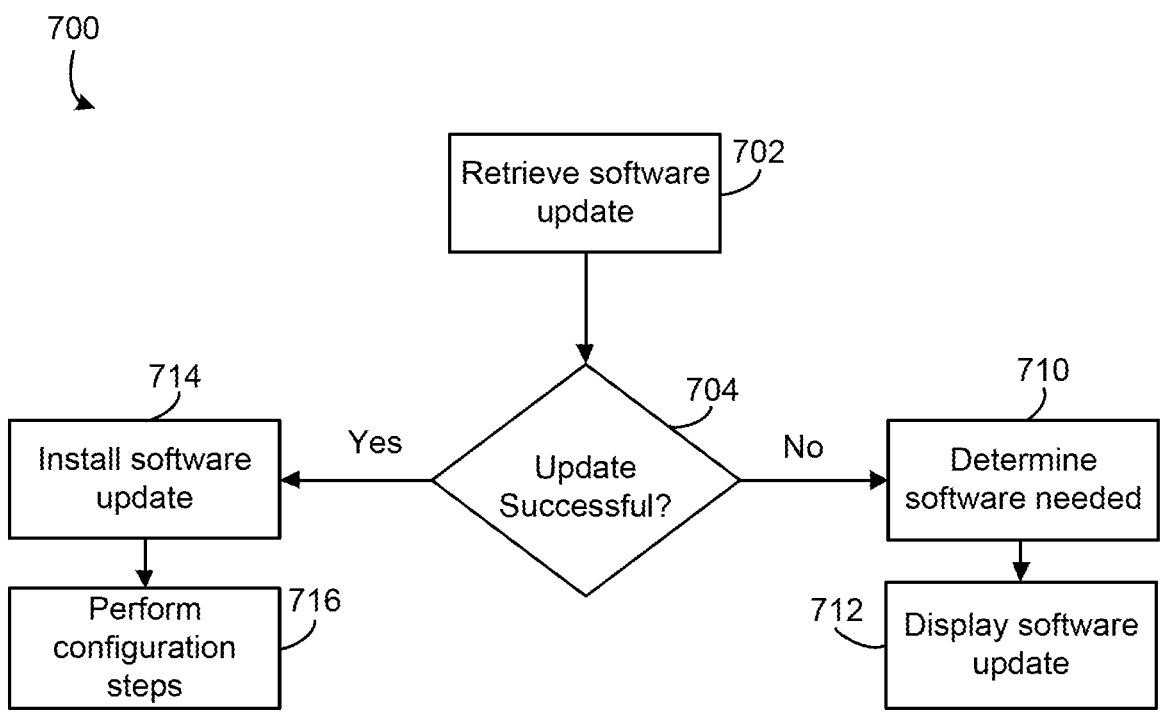
FIG. 7 is a flow diagram illustrating a process for updating software for the master device of FIGS. 4-5, according to an exemplary embodiment.

Referring now to FIG. 7, a flow diagram of process 700 for installing a software update is shown, according to an exemplary embodiment. In some embodiments, process 700 is performed by master device 402, as described with reference to FIGS. 4-5. In step 702, master device 402 retrieves a software update for an HVAC device (e.g., HVAC device 406). In some embodiments, retrieving the software update includes retrieving software package 412 from HVAC device 406. In various embodiments, retrieving a software update includes sending a request to software update server 408 and/or receiving a software update push. In step 704, if master device 402 determines that it was unsuccessful in retrieving a software update and/or patch, master device performs step 710. In some embodiment, master device 402 first attempts to retrieve the software update and/or software patch from HVAC device 406. If master device 402 determines that the software retrieval from HVAC device 406 has failed and/or is not possible, master device 402 attempts to retrieve the software update from software update server 408. In some embodiments, master device 402 is not enabled to retrieve the software update from software update server 408. Master device 402 may display a phone number for a technician in the event that master device 402 cannot retrieve a software update from either HVAC device 406 or software update server 408. The technician may be able to cause a software update to be pushed to master device 402 via network 404.

In some embodiments, when master device 402 fails to retrieve the software update and/or patch from HVAC device 406 and software update server 408, master device 402 performs step 710. In step 710, the master device 402 determines the necessary software version, patch, and/or plugin necessary to communicate with HVAC device 406. In some embodiments, the software version is determined by sending a query to software update server 408. In some embodiments, the query includes the current software version of master device 402, an address of HVAC device 406, a name and/or identifier of HVAC device 406, and/or any other information necessary for determining the necessary software update. In some embodiments, master device 402 includes a software version database and is able to identify the software version, patch, and/or plugin necessary via the database.

In step 712, master device 402 displays the software update to be installed on user interface 510. In some embodiments, user interface 510 displays the name of the software, the reason for updating the software, and/or directions for updating the software. In some embodiments, the user interface 510 displays a message indicating that the master device 402 has attempted to retrieve the software automatically and has failed. In various embodiments, the user interface 510 may display a message to call a service technician and display a phone number for the service technician. In some embodiments, user interface 510 may display a message indicating the master device 402 is unable to determine the identity of the necessary software update and should contact the service technician for help.

In step 704, if the master device 402 determines that the software has been successfully retrieved, the master device 402 may install the software update (step 714). In some embodiments, installing the software may cause the master device 402 to reboot and install the new software and/or software patch during a boot cycle. In some embodiments, the software update may be installed in the background while master device 402 is running. In some embodiments, installing the software update includes causing an install message to be displayed on user interface 510. The install message may prompt a user to install the software package and/or patch. If the user does not press a button causing the master device 402 to install the software package and/or patch, master device 402 may wait a predefined amount of time before installing the software package and/or patch. In some embodiments, the amount of time is displayed on user interface 510 as a countdown. In step 716, master device 402 maps the points of HVAC device 406, sends test data to HVAC device 406, and/or performs any other configuration and/or testing action. In some embodiments, master device 402 performs step 716 in response to successfully updating the software of master device 402.

Figure 8:
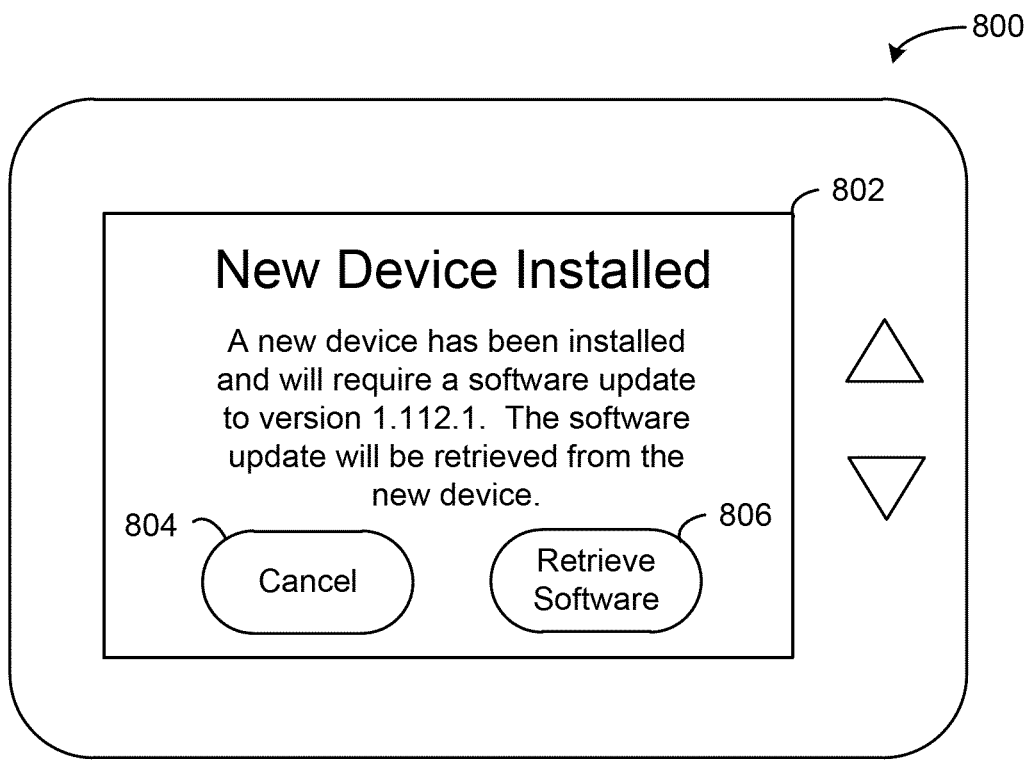
FIG. 8 is a drawing of a display for the master device of FIGS. 4-5 requesting a user install a software update from the HVAC device 406 of FIGS. 4-5, according to an exemplary embodiment.

Referring now to FIG. 8, a drawing 800 of an installation prompt 802 for master device 402 is shown, according to an exemplary embodiment. In some embodiments, the installation prompt 802 may be displayed on user interface 516 of master device 402. In some embodiments, the installation prompt 802 may identify that a new HVAC device and/or system has been installed inside or outside a building (e.g., building 10). Installation prompt 802 may identify that the software version of master device 402 is not currently up-to-date and/or not the proper version for communicating with the new HVAC device and/or system. Installation prompt 802 may ask the user to allow the master device 402 to automatically retrieve and/or install the software version from an HVAC device (e.g., HVAC device 406). In some embodiments, the user may be present with two buttons. The buttons may be a cancel button (e.g., cancel button 804) and a confirmation button (e.g., retrieve software button 806). Pressing cancel button 804 may cause the master device 402 to ignore the HVAC device and operate as normal. Pressing the retrieve software button 806 may cause master device 402 to retrieve the necessary software update from the HVAC device and install it accordingly. In various embodiments, prompt 802 is displayed based on a device incompatibility determination made by master device 402. In various embodiments, prompt 802 and/or a command to display prompt 802 is pushed to master device 402 from an HVAC device (e.g., HVAC device 406).

Figure 9:
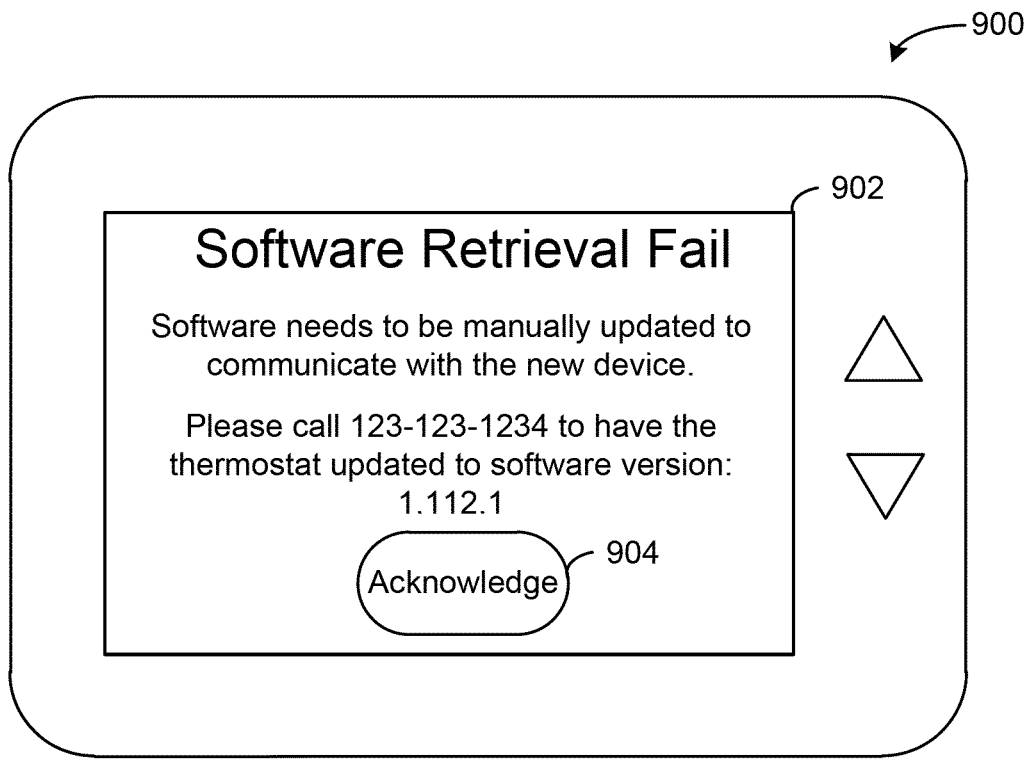
FIG. 9 is a drawing of a display for the master device of FIGS. 4-5 notifying a user that a software retrieval has failed, according to an exemplary embodiment.

Referring now to FIG. 9, a drawing 900 of a software retrieval failure message 902 is shown, according to an exemplary embodiment. In some embodiments, message 902 may be displayed on master device 402. In some embodiments, the message 902 may be displayed whenever retrieving a software update from a HVAC device (e.g., 406) and/or software update server 408. In some embodiments, message 902 may include the software version that the user needs to manually install. Message 902 may include an acknowledge button 904. If the user presses the acknowledge button, the master device 402 may be configured to prompt the user to install the software via an SD card, a USB drive and/or any other method for installing the software update. In some embodiments, failure message 902 may include a technician phone number and/or other technician contact information.

Multi-Zone System

Referring now generally to FIGS. 10-14, systems and methods are shown for performing software updates for a multi-zone system, according to various exemplary embodiments. In a multi-zone system, there may be multiple thermostats and/or zone sensors, each associated with a particular zone of a building, the building including multiple zones. Each of the thermostats and/or sensors can collect, via sensors (e.g., ambient temperature sensors, ambient humidity temperature sensors, air quality sensors, etc.) environmental conditions of a particular zone. The thermostats and/or sensors can be configured to control the building equipment to control an environmental condition of the zone that the thermostat and/or sensor is associated with (e.g., control a temperature, humidity, air quality, etc.). In some embodiments, the thermostat and/or sensors can communicate with a zone controller, the zone controller being configured to control the building equipment to control the environmental condition of each of the zones based on sensor readings and/or environmental settings (e.g., setpoints, heating setpoints, cooling setpoints, etc.) received from each of the thermostats and/or sensors.

The zone controller can be shipped with a memory device storing a software package that may be the newest software for the thermostats, sensors, and/or the zone controller. When the zone controller is installed at a particular site, the zone controller can determine whether the software versions of the thermostats, sensors, and/or any other zone controllers are up-to-date by comparing a software version of the software run by the thermostats, sensors, and/or any other zone controllers to the software versions of the software stored by the zone controller. The zone controller can be configured to push software updates to the thermostats, sensors, and/or other zone controllers in response to determining that the software stored by the zone controller is newer than the software run by the thermostat, sensor, and/or other zone controller.

In response to a determination that the software run by the thermostats, sensors, and/or other zone controllers is newer than the software stored by the zone controller, the zone controller can be configured to retrieve and store the most up-to-date software versions from the thermostats, sensors, and/or other zone controllers. In this regard, the zone controller can act as a software repository that can store the most up-to-date software for the multi-zone system and distribute the stored software to various devices of the multi-zone system.

The zone controller can include a memory device (e.g., serial flash memory tied to a main microprocessor). The zone controller can be configured to utilize the memory device to provide the zone controller with the ability to receive a software update from a master thermostat through a first communications protocol bus. The zone controller can be associated with a zone control address (e.g., 0xC7) of a communications bus and can be configured to push a software update to another zone thermostat and/or sensor on a second communications bus managed by the zone controller.

The zone controller can be configured to push a software update to a secondary zone controller. The zone controller can be configured to push a software update to a secondary zone control address (e.g., 0xC8) associated with the secondary zone controller. Upon receiving a software update, the zone controller can be configured to update its own software and/or push the software update to a zone sensor installed on its input port. The zone controller can be shipped from a supplier with the required software versions needed for and initial zoning setup e.g., the software necessary to push to other zone controllers, thermostats, and/or sensors enabling those devices to operate in zone based modes.

TABLE 1

Devices and Software Versions

| Device Type | Software Version |
| --- | --- |
| Zone Controller | 1.00zc |
| Zone Thermostat | 2.00ps |
| Zone Sensor | 1.00zs |

Upon initial power-up, the zone controller can send a request for software versions from any thermostats, secondary zone controllers, or sensors connected to the zone controller. The zone controller can determine whether a device (e.g., thermostat, sensor, secondary zone control) on the zoning communications bus managed by the zone controller does not have software supporting zoning logic (e.g., does not have the most up to date software version). The zone controller can store a table similar and/or the same as Table 1 indicating the software version of the software for various pieces of equipment. The zone controller can be configured to push a software update to the non-supported thermostat, sensor, and/or secondary zone controller.

If a stored software versions stored by the zone controller is older (e.g., has a value less than) a received software version communicated from a thermostat, sensor, and/or secondary zone controller on the zoning communications bus, the zone controller can be configured to retrieve (e.g., request and receive) the software of the thermostat, sensor, and/or zone controller, and update the software stored in the memory device of the zone controller with the retrieved software.

Prior to the zone controller executing a software update, if an active call (e.g., a call to perform heating or cooling) for system operation is present, the zone controller can be configured to postpone the update until the active call for system operation is no longer present. When the system is in standby mode (the heating or cooling has been completed), the zone controller can be configured to update a particular register (e.g., register 022 most significant bit (MSB)) causing the zone controller to operate in a non-zoning mode. The non-zoning mode may cause the zone controller to control building equipment to control an environmental condition of multiple conditions together instead of independently as would be done in a zoning mode. The zone controller can be configured to remain in the non-zoning mode until all devices (e.g., thermostats, sensors, and/or other zone controllers) have finished updating their software.

While performing a software update, the zone controller can be configured to update a particular register (e.g., register 100A MSB) to indicate that the software update is in progress. The zone controller can cause a thermostat e.g., a primary master thermostat, to display text indicating that the software update is in progress. The text may be "UPDATING ZONE SOFTWARE . . . ." The thermostat may display the updating software text until the zone controller disables the software update bit. In this regard, the register indicating that an update is in progress can be communicated between the zone controller and the thermostat. In some embodiments, the zone controller includes a user interface configured to display the same and/or similar software update text. The zone controller can be configured to display the text, until the software update is complete for all sensors on the system.

During the software update process, the zone controller can be configured to monitor the software versions of the thermostats, sensors, and/or zone controllers. After all software versions of the various devices are equal to the primary zone controller's stored software version, the zone controller can be configured to end the software update. To end the software update, the zone controller can be configured to determine whether an active system call is present. The zone controller can be configured to remain in the non-zoning mode previously entered into until the active call for system operation is no longer present. When the system returns to standby mode (e.g., the active call ends), the zone controller can be configured to enter zone based operation. The zone controller can be configured to enter zone based operation by updating register 022 MSB, the zoning bit by enabling the zoning bit. The zone controller can be configured to update register 100A MSB to indicate that the zoning system software update is complete.

Figure 10:
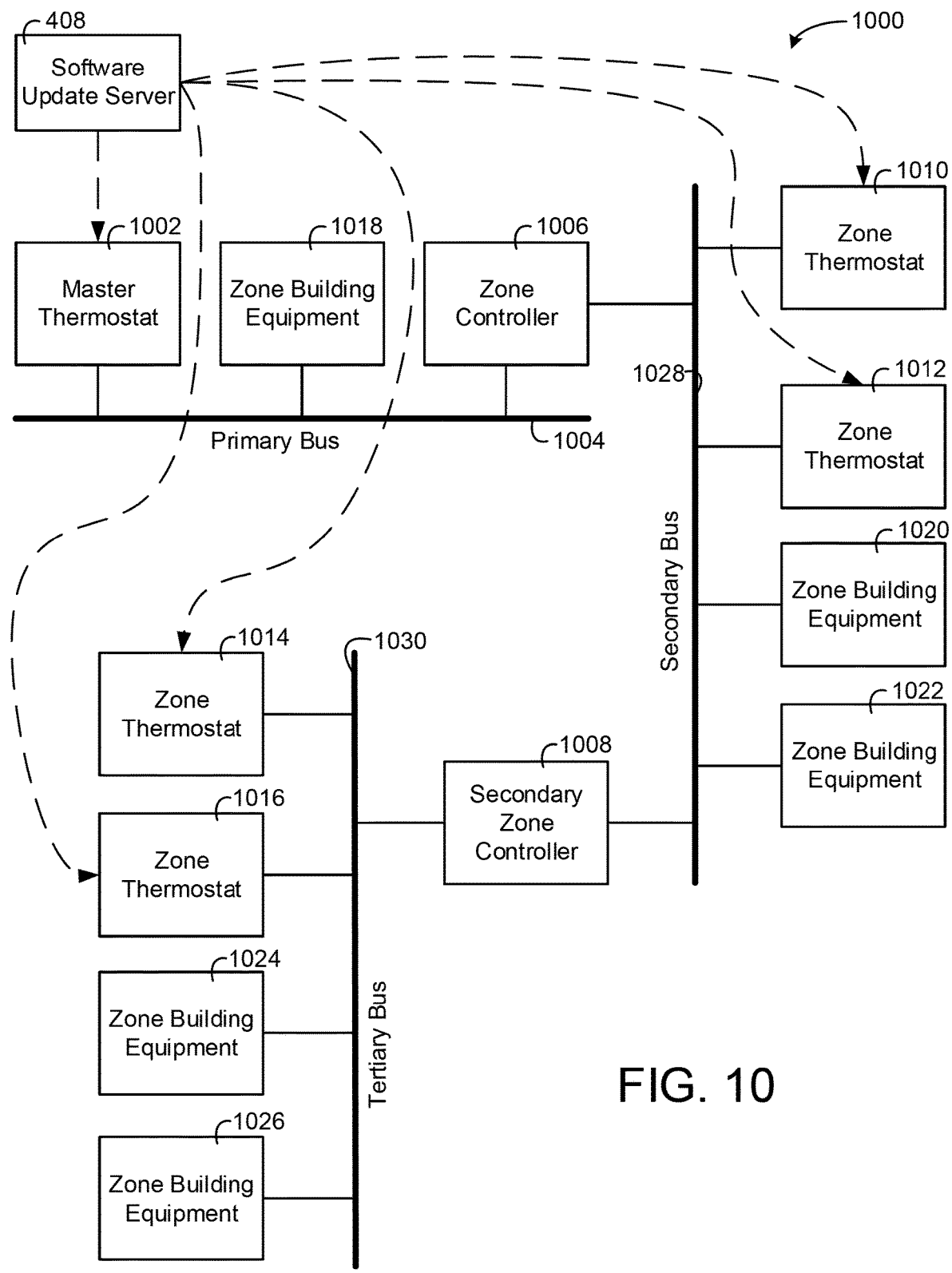
FIG. 10 is a block diagram of a multi-zone controller system including thermostats, zone controllers, and a software update server, according to an exemplary embodiment.

Referring now to FIG. 10 a block diagram of a system 1000 is shown including software update server 408 of FIG. 4, a master thermostat 1002, a zone controller 1006, zone thermostats 1010-1016, and zone building equipment 1018. Software update server 408 can be configured to store the most current software versions for master thermostat 1002, zone controllers 1006-1008, and/or zone thermostats 1010-1016. Software update server 408 may be updated, by a technician, to store the most recent software version for the devices. The software update server 408 can be configured to push the software updates to master thermostat 1002 and/or zone thermostats 1010-1016 for each of the devices to install and/or push to another device. Software update server 408 can be configured to push software updates via the Internet and each of master thermostat 1002 and/or zone thermostats 1010-1016 can be configured to receive the software updates via a Wi-Fi network, e.g., network 404.

In some embodiments, the Wi-Fi network may be unavailable or all of the master thermostat 1002 and/or zone thermostats 1010-1016 may not have Wi-Fi communication available and/or enabled. In this regard, zone controller 1006 can be configured to store (can be shipped with) software updates for thermostats 1002 and/or 1010-1016. Furthermore, zone controller 1006 can be configured to store software updates for secondary zone controller 1008.

Master thermostat 1002 may be a primary thermostat of building 10 as described with reference to FIG. 1. Building 10 may include multiple different zones, the master thermostat 100 being associated with one of the zones. Master thermostat 1002 can be configured to manage a primary bus 1004. Primary bus 1004 may be a network that master thermostat 1002 is the master device on. Primary bus 1004 may be an RS-485 network bus and/or may be the same as and/or similar to network 404. Zone building equipment 1018 may be an air conditioner and/or heat pump, a smart zone vent, a zone air conditioner, a variable refrigerant flow (VRF) device, and/or any of the other building equipment described herein. Zone building equipment 1018 may be associated with building 10 and/or specific to the zone master thermostat 1002 is located in. Master thermostat 1002 and/or zone controller 1006 can be configured to operate zone building equipment 1018 to control an environmental condition of building 10 or the zone of master thermostat 1002.

Zone controller 1006 may be a panel connected to primary bus 1004. Zone controller 1006 can be a zone panel configured to receive input data (e.g., zone temperature values, zone humidity values, zone setpoints, etc.) from multiple thermostats and/or sensors (e.g., zone thermostats 1010-1012) and operate zone building equipment 1020-1022 based on the collected input data. In some embodiments, zone controller 1006 receives a control decision for a zone associated with either zone thermostat 1010 and/or zone thermostat 1012 from either zone thermostat 1010 and/or zone thermostat 1012 and can control zone building equipment 1020 and/or 1022 to control the environmental conditions of the zones of zone thermostats 1010 and/or 1012. Zone building equipment 1020 and/or zone building equipment 1022 may be the same and/or similar to zone building equipment 1018. Zone thermostats 1010-1012 may be the same as and/or similar to master thermostat 1002.

Zone controller 1006 may be a slave on primary bus 1004 but may be a master of secondary bus 1028. Zone controller 1006 can be configured to push software updates to the devices on secondary bus 1028 and/or primary bus 1004. Furthermore, zone controller 1006 can be configured to receive and/or store software updates from the devices of primary bus 1004 and/or secondary bus 1028. For example, zone controller 1006 can be configured to receive a thermostat software update from master thermostat 1002 that master thermostat 1002 has received from software update server 408. Zone controller 1006 can be configured to store and/or push the thermostat software update to zone thermostat 1010 and/or zone thermostat 1012. Furthermore, zone controller 1006 can be configured to store (e.g., may be shipped from a manufacturer storing) and/or receive a zone controller software update from master thermostat 1002 via software update server 408 (or via zone thermostat 1010-1022) and install the zone controller software update and/or push the software update to secondary zone controller 1008.

Secondary zone controller 1008 may be a slave on secondary bus 1028. Secondary zone controller 1008 can be the same as and/or similar to zone controller 1006. In this regard, secondary zone controller 1008 can be configured to operate (may be the master of) tertiary bus 1030. Secondary zone controller 1008 can be configured to control zone thermostat 1014-1016 and/or zone building equipment 1024-1026. In some embodiments, secondary zone controller 1008 can be configured to receive a thermostat software update from one or both of zone thermostats 1014 and/or zone thermostat 1016. Secondary zone controller 1008 can be configured to push the thermostat software update to zone controller 1006 if zone controller 1006 has an older thermostat software version than secondary zone controller 1008. Zone controller 1006 can be configured to distribute the thermostat software update as necessary, e.g., send the software update to master thermostat 1002 and/or zone thermostats 1010-1012.

Figure 11:
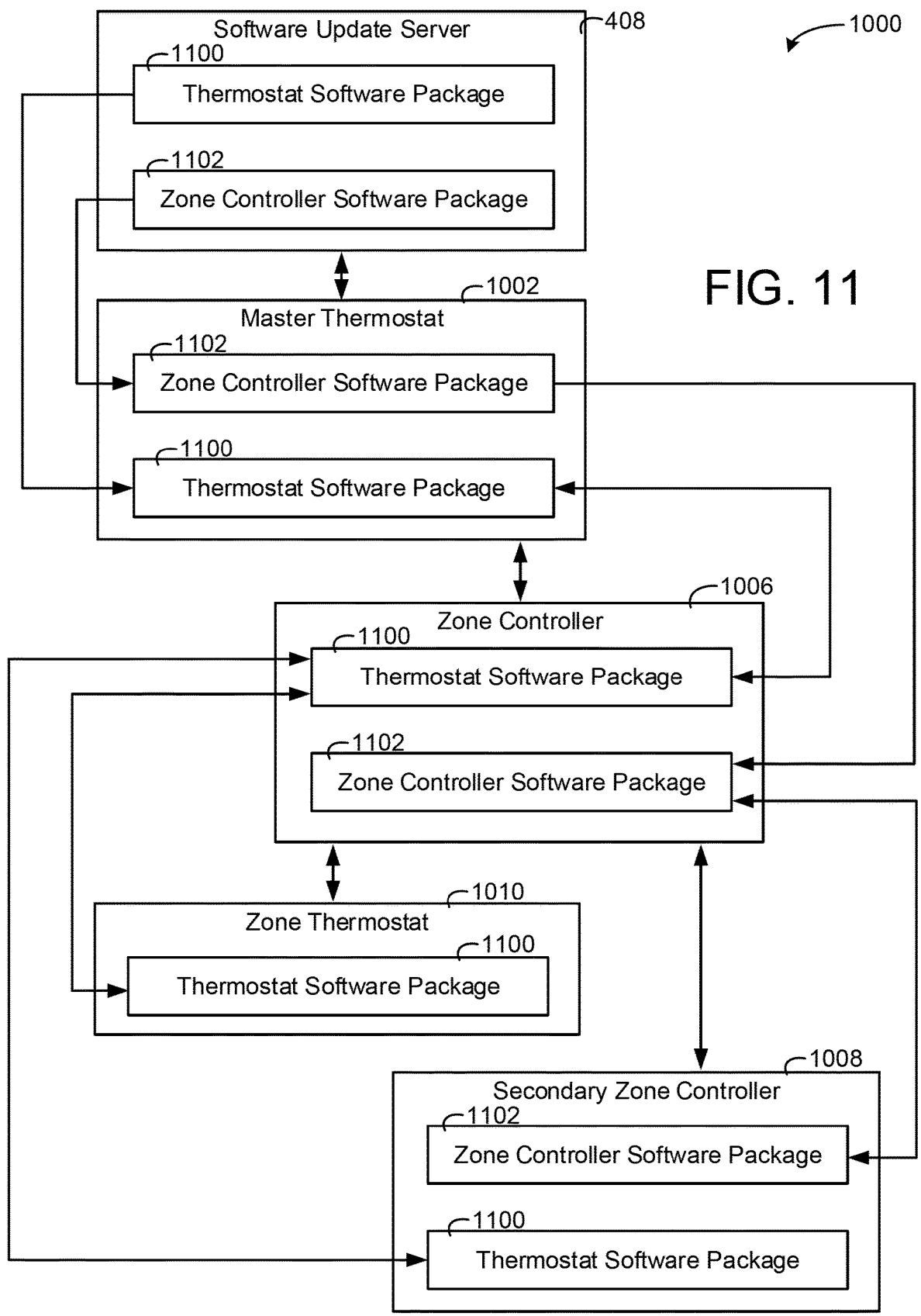
FIG. 11 is a block diagram of the multi-zone controller system of FIG. 10 performing software updates, according to an exemplary embodiment.

Referring now to FIG. 11, system 1000 is shown illustrating the various software update paths that can occur in system 1000, according to an exemplary embodiment. In FIG. 11, two software packages are shown to be stored by the various devices of system 1000. The software packages are thermostat software package 1100 which may be a software version for master thermostat 1002 and/or thermostats 1010-1016. However, thermostat software package 1100 may be a software package for a zone sensor (e.g., a sensing device that does not have control functionality) instead of and/or in addition to being a software package for a thermostat with control functionality. The second software package is zone controller software package 1102. Zone controller software package 1102 may be a software version for zone controller 1006 and/or secondary zone controller 1008.

FIG. 11 indicates fewer devices than FIG. 10 for the sake of illustration. The system 1000 is not limited to the number of devices shown and can include any number of devices. Software update server 408 is shown to push package 1100 and package 1102 to master thermostat 1002. Master thermostat 1002 can store the various software packages 1100-1102 received from software update server 408. Zone controller 1006 can be configured to send master thermostat 1002, zone thermostat 1010, and/or secondary zone controller 1008 a request for the current version of thermostat and/or controller software that they are storing. The software that each stores may be software updated via update server 408 or otherwise software stored by the devices when manufactured and shipped. Zone controller 1006 can be configured to receive the software versions and compare the value of the software versions to the current software version numbers of package 1100 and/or package 1102 stored by zone controller 1006.

If zone controller 1006 determines that zone controller 1006 stores the most up-to-date software, the software number of packages 1100 and/or 1102 stored by zone controller 1006 is greater than the software versions stored by the devices, zone controller 1006 can be configured to push package 1100 and/or 1102 to the master thermostat 1002, zone thermostat 1010, and/or secondary zone controller 1008 as appropriate. If zone controller 1006 determines that the software version on one or multiple other devices are greater than the software version number stored by zone controller 1006, zone controller 1006 can retrieve a software update from that device.

For example, if zone thermostat 1010 has a software version of 10 for thermostat software package 1100 but zone controller 1106 has a software version of 9 for thermostat software package 1100, thermostat 1010 can retrieve (e.g., request and/or receive) thermostat software package 1100 from zone thermostat 1010. Secondary zone controller 1008 can be configured to perform the same and/or similar software updates. If zone controller 1006 determines that the versions of packages 1100 and 1102 match the versions of the software packages stored by zone thermostat 1010, secondary zone controller 1008, and master thermostat 1002, zone controller 1006 can determine that no software updates are necessary and may not take any software update steps.

Figure 12:
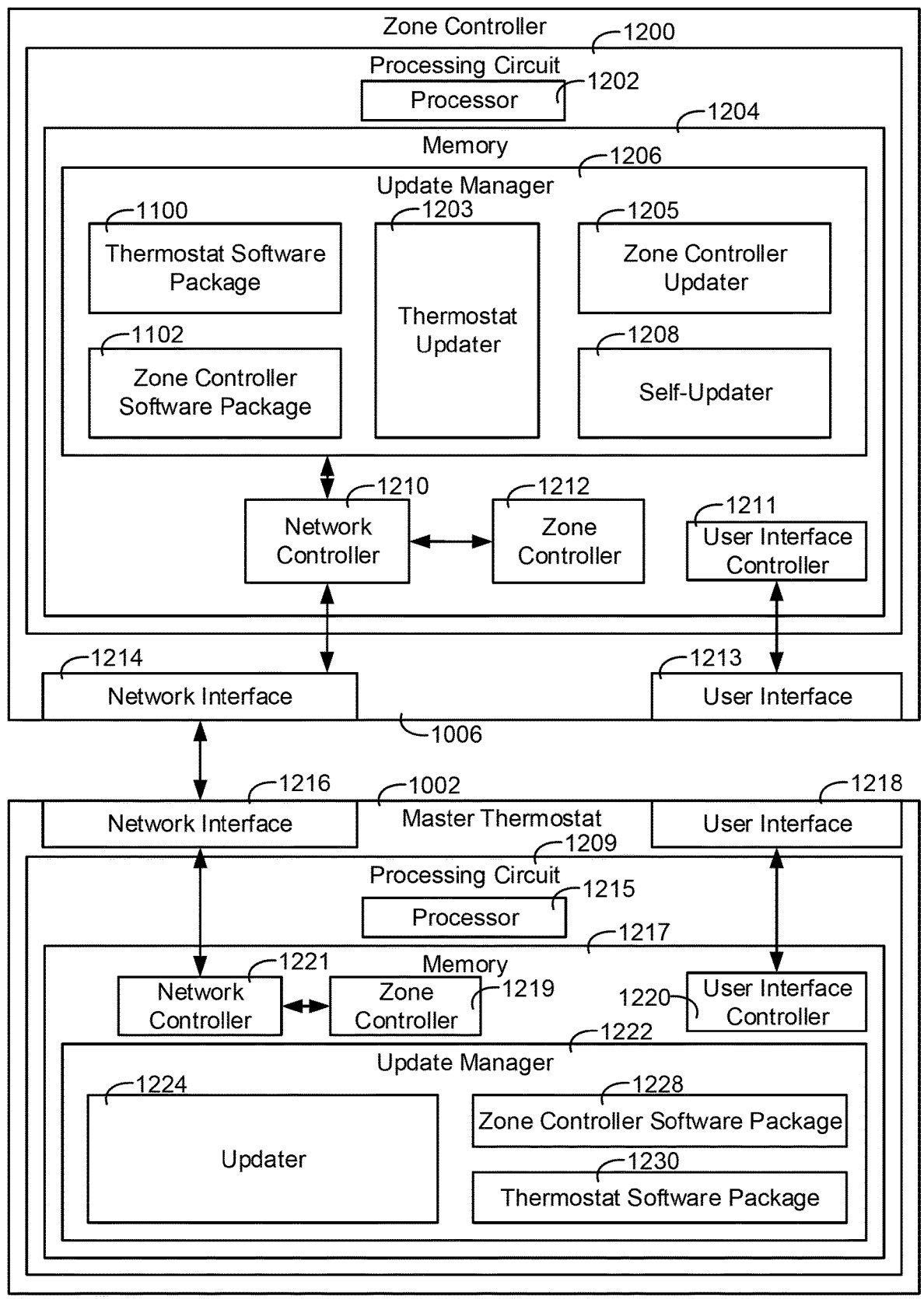
FIG. 12 is a block diagram of a thermostat and a zone controller of the multi-zone controller system of FIGS. 10-11, according to an exemplary embodiment.

Referring now to FIG. 12, a block diagram illustrating zone controller 1006 and master thermostat 1002 in greater detail is shown, according to an exemplary embodiment. Zone controller 1006 is shown to include a processing circuit 1200, a network interface 1214, and a user interface 1213. Processing circuit 1200 is shown to include a processor 1202 and a memory 1204. Processing circuit 1200, processor 1202, and/or memory 1204 may be the same and/or similar to processing circuit 502, processor 504, and/or memory 506 of FIG. 5. Network interface 1214 can be configured to facilitate communication with primary bus 1004 and/or secondary bus 1028. Network interface 1214 may be the same as and/or similar to network interface 508. User interface 1213 can be configured to display output to a user and/or receive input from a user. User interface 1213 can be configured to display an indication of the status of a software update, e.g., "UPDATING SOFTWARE." User interface 1213 can be the same as and/or similar to user interface 510 as described with reference to FIG. 5.

Memory 1204 is shown to include an update manager 1206, a network controller 1210, a zone controller 1212, and a user interface controller 1211. Network controller 1210 can be configured to operate network interface 1214 to transmit and/or receive data. For example, network controller 1210 can be configured to transmit and/or receive a software update, a control command, zone conditions (e.g., a zone temperature setpoint and/or ambient temperature), etc. Network controller 1210 can be configured to receive a control decision from zone controller 1212 and send the control decision to building equipment (e.g., zone building equipment 1020-1022). Zone controller 1212 can be configured to perform environmental condition control (e.g., temperature control) based on setpoints and/or measured environmental condition levels received from zone thermostats 1010-1012. Zone controller 1212 can be configured to perform various control algorithms, e.g., proportional (P) control algorithms, proportional integral (PI) control algorithms, proportional integral derivative (PID) control algorithms, model predictive control (MPC) algorithms, and/or any other control algorithm.

Update manger 1206 is shown to include thermostat software package 1100 and zone controller software package 1102. Update manager 1206 can be configured to push the packages 1100 and/or 1102 to various devices that need a software update and/or can receive a software update replacing packages 1100 and/or 1102 from another device. In some embodiments, zone controller 1006 operates based on the software of zone controller software package 1102.

Update manager 1206 is shown to include thermostat updater 1203. Thermostat updater 1203 can be configured to update and/or push thermostat software package 1100 to various devices (e.g., thermostats). Thermostat updater 1203 can send a request via network interface 1214 to various thermostats, e.g., master thermostat 1002 for a current thermostat software version. Thermostat updater 1203 can receive the thermostat software version and compare the version to the thermostat software version stored by update manager 1206. If thermostat updater 1203 determines that thermostat software package 1100 stored by update manager 1206 is newer than the software operated by master thermostat 1002, thermostat updater 1203 can update the thermostat of master thermostat 1002 which may include transmitting thermostat software package 1100 stored by update manager 1206 to master thermostat 1002. If thermostat updater 1203 determines that the software stored by master thermostat 1002 is newer than that thermostat software package 1100 stored by update manager 1206, thermostat updater 1203 can retrieve the thermostat software operated by master thermostat 1002 and update the stored software package 1100 with the retrieved software package.

Update manager 1206 is shown to include zone controller updater 1205. Zone controller updater 1205 can be configured to update the zone controller software package 1102 and/or push the zone controller software package 1102 to another device (e.g., secondary zone controller 1008) which may require the software package 1102. Zone controller updater 1205 can be configured to send a request for a zone controller software version to multiple devices. The devices may include master thermostat 1002, zone thermostat 1010, and/or secondary zone controller 1008. Zone controller updater 1205 can compare the received software versions against the software version of zone controller software package 1102 to determine whether zone controller software package 1102 is newer or older than the software packages stored and/or operated by the other devices. If the software package 1102 has a software version higher (e.g., package 1102 is newer), zone controller updater 1205 can push a software update to the device. If software package 1102 has a software version lower (e.g., package 1102 is newer), zone controller updater 1205 can be configured to retrieve the software version from the device and update the stored package 1102 with the retrieved software version.

Update manager 1206 is shown to include self-updater 1208. Self-updater 1208 can be configured to install and/or run software package 1102. Software package 1102 may be a software version that zone controller 1006 can be configured to run. Self-updater 1208 can be configured to determine whether package 1102 is currently installed by zone controller 1006. In response to a determination that package 1102 is new and not currently used by zone controller 1006, self-updater 1208 can install, reboot, and/or perform any other actions to cause zone controller 1006 to operate on software package 1102.

Master thermostat 1002 is shown to include network interface 1216, user interface 1218, and processing circuit 1209. Network interface 1216 can be configured to allow master thermostat 1002 to communicate via primary bus 1004. Network interface 1216 may be the same as and/or similar to network interface 1214. User interface 1218 can be configured to display various interfaces to a user (e.g., setpoint selection interfaces, scheduling interfaces, etc.). User interface 1218 can be configured to display an indication of a current status of a software update of master thermostat 1002. User interface 1218 can be the same and/or similar to user interface 1213.

Processing circuit 1209 is shown to include processor 1215 and memory 1217. Processing circuit 1209, processor 1215, and/or memory 1217 may be the same as and/or similar to processing circuit 1200, processor 1202, and memory 1204. Memory 1217 is shown to include network controller 128, zone controller 1219, user interface controller 1220, and update manager 1222. Network controller 1221 can be configured to enable master thermostat 1002 to communicate via network interface 1216. For example, network controller 1221 can be configured to cause network interface 1216 to send and/or receive data via primary bus 1004 and/or via network 404.

Zone controller 1219 can be configured to generate control decisions for building equipment e.g., zone building equipment 1018. Zone controller 1219 can be configured to operate building equipment to control an environmental condition of building 10 and/or a zone of building 10. Zone controller 1219 can be the same and/or similar to zone controller 1212 and can be configured to operate a similar control algorithm as zone controller 1212. In some embodiments, zone controller 1219 receives a zone setpoint via user interface 1218 and based on temperature sensor readings of temperature sensors of master thermostat 1002, can generate control decision which can be transmitted to building equipment via network interface 1216.

Update manager 1222 can be configured to store zone controller software package 1228 and thermostat software package 1230. Package 1228 and/or package 1230 can be the same and/or similar to package 1100 and/or package 1102 but may be different versions. Updater 1224 can be configured to receive a request from zone controller 1006 for a software version of package 1228 and/or 1230 and can send the software version to zone controller 1006. Zone controller 1006 can send a software update to updater 1224 which updater 1224 can use to override (e.g., update) one or both of package 1228 and/or package 1230. In some embodiments, zone controller 1006 can send updater 1224 a request for updater 1224 to send package 1228 and/or package 1230 to zone controller 1006 if master thermostat 1002 stores newer software than zone controller 1006. In response to the request, updater 1224 can be configured to send package 1228 and/or package 1230 to zone controller 1006.

Figure 13:
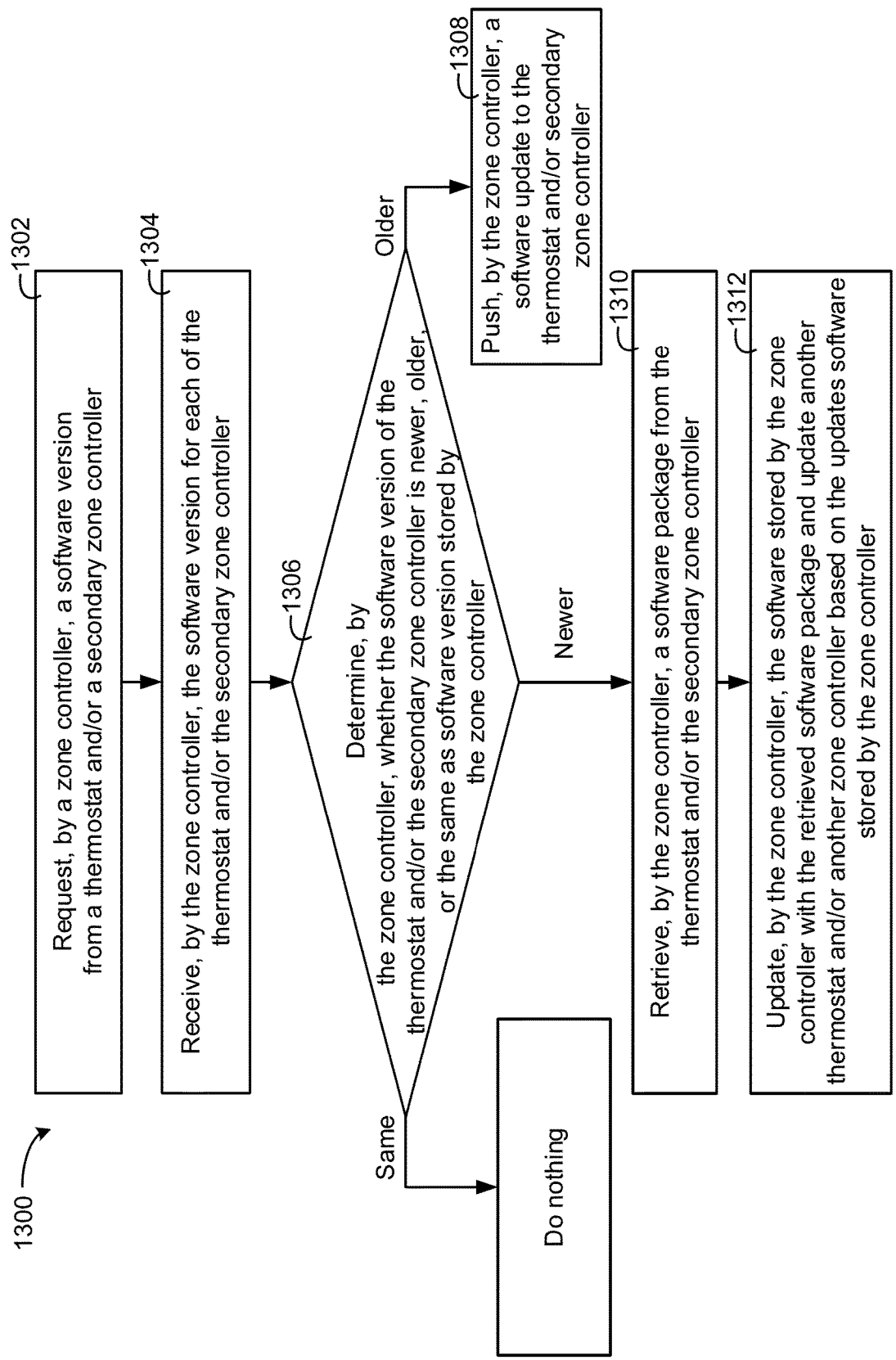
FIG. 13 is a flow diagram of a process for the zone controller of FIG. 12 for detecting whether a software update is necessary for a thermostat or zone controller of the multi-zone controller system of FIGS. 10-11 and performing the software update, according to an exemplary embodiment.

Referring now to FIG. 13, a process 1300 is shown for performing software updates for the system 1000, according to an exemplary embodiment. Zone controller 1006 can be configured to perform the process 1300. In some embodiments, update manager 1206 of zone controller 1006 can be configured to perform process 1300. Although the process 1300 is described with reference to zone controller 1006 performing the process 3800, any computing device described herein can be configured to perform the process 1300.

In step 1302, zone controller 1006 can send a software version request to a thermostat and/or a secondary zone controller. The thermostat may be master thermostat 1002 and/or zone thermostats 1010-1016. The secondary zone controller may be secondary zone controller 1008. In some embodiments, zone controller 1006 performs step 1302 in response to being turned on and/or periodically (e.g., every hour, every day, every month, etc.). Zone controller 1006 can send the request to master thermostat 1002, zone thermostats 1010-1016, and/or secondary zone controller 1008. In some embodiments, the request causes the thermostat and/or secondary zone controller to reply with a value indicative of the version of software currently run by the thermostat and/or the secondary zone controller. In step 1304, zone controller 1006 can receive the software version from the thermostat and/or secondary zone controller.

In step 1306, zone controller 1006 can determine whether the software version of the thermostat and/or secondary zone controller is newer, older, or the same as a software version stored by zone controller 1006. For example, zone controller 1006 can compare a thermostat zone software version received from the thermostat to a stored version of thermostat software (e.g., thermostat software package 1100). If the value received from the thermostat is greater than the stored version value, zone controller 1006 can determine that the software on the thermostat is newer than the software stored by zone controller 1006. If the values are equal, zone controller 1006 can determine that all the software is up-to-date. If the value received from the thermostat is less than the value of the software stored by zone controller 1006, zone controller 1006 can determine that the software of the thermostat is old and needs to be updated. Zone controller 1006 can perform the same version comparison for the version received from the secondary zone controller for zone controller software (e.g., zone controller software package 1102).

In step 1308, zone controller 1006 can push a software update to the thermostat and/or secondary controller in response to a determination (step 1306) that the software version of the thermostat and/or secondary zone controller is older than the software version stored by the zone controller 1006. Pushing the software update can cause the receiving thermostat and/or secondary zone controller to install the software and/or perform a reboot.

In step 1310, zone controller 1006 can be configured to retrieve the software run on the thermostat and/or secondary zone controller in response to a determination that the software version of the thermostat and/or secondary zone controller is newer than the software version stored by the zone controller. In this regard, zone controller 1006 can update its stored software with the retrieved software of step 1310 (step 1312). This can enable zone controller 1006 to maintain the most up-to-date software and push the updated software to another thermostat or another zone controller. Pushing the updates software to another thermostat and/or another zone controller may include performing step 1308 and/or process 1300 a second time.

Figure 14:
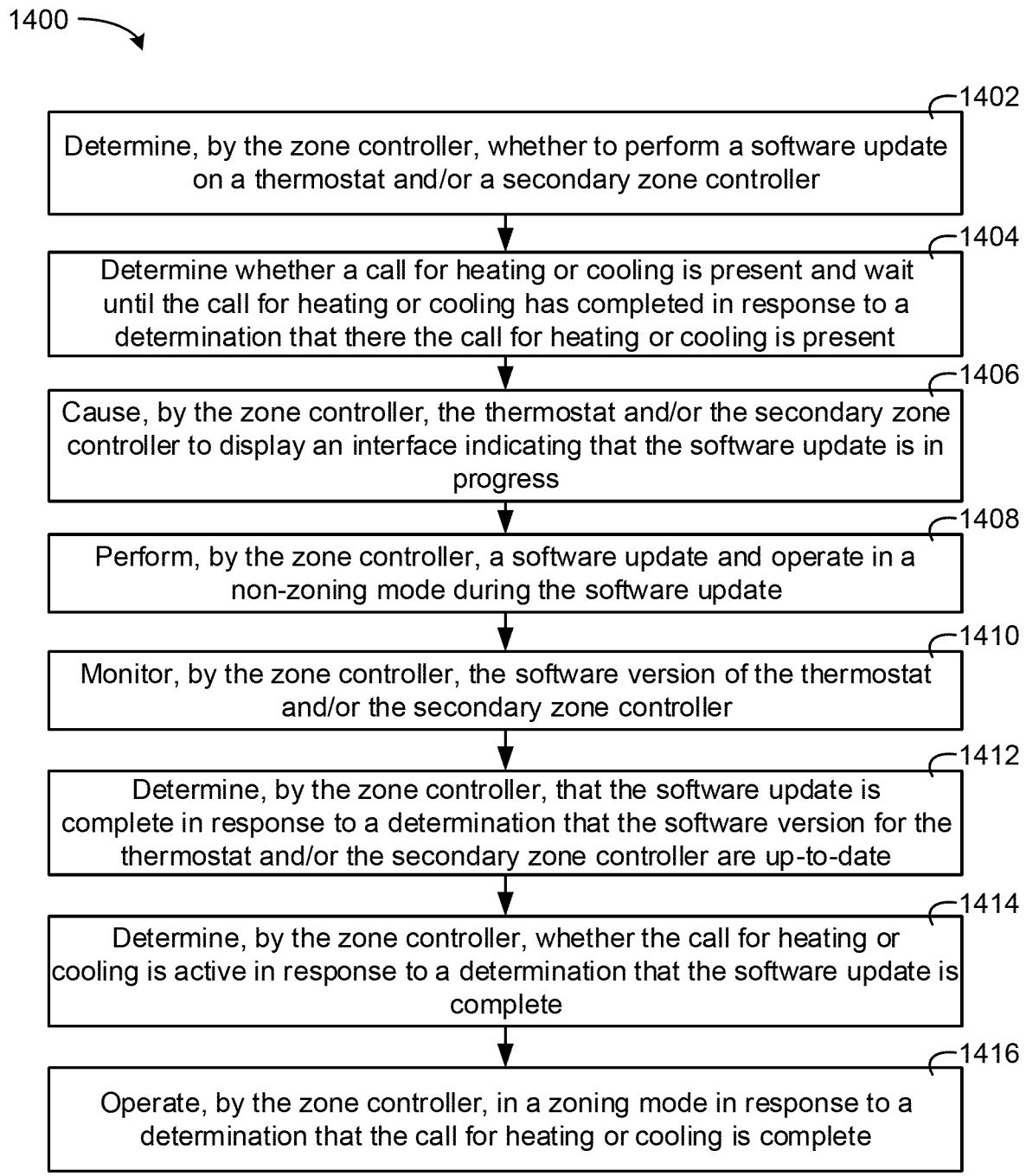
FIG. 14 is a flow diagram of a process for the zone controller of FIG. 12 for illustrating the software update process of FIG. 13 in greater detail, according to an exemplary embodiment.

Referring now to FIG. 14, a process 1400 is shown for performing a software update by zone controller 1006, according to an exemplary embodiment. Zone controller 1006 can be configured to perform process 1400. In some embodiments, update manager 1206 of zone controller 1006 can be configured to perform process 1400. Although process 1400 is described with reference to zone controller 1006 performing process 1400, any computing device described herein can be configured to perform process 1400.

In step 1402, zone controller 1006 can determine whether it is necessary to perform a software update for a thermostat and/or secondary controller. For example, zone controller 1006 can determine, based on the steps of process 1300, whether master thermostat 1002, secondary zone controller 1008, and/or zone thermostats 1010-1016 require a software update.

In step 1404, zone controller 1006 can determine whether there is an active call for heating or cooling. An active call for heating or cooling may be present if zone controller 1006 is controlling building equipment to heat and/or cool a zone of building 10. If there is an active call for heating or cooling, zone controller 1006 can pause the update process until the call has been completed. In step 1406, zone controller 1006 can cause (e.g., send a command or indication) the thermostat and/or the secondary zone controller to display an interface indicating that a software update is in progress. Zone controller 1006 itself can display an interface with an indication that a software update is in progress.

In step 1408, zone controller 1006 can perform the software update (e.g., pushing the software update to the thermostat and/or secondary zone controller) while operating in a non-zoning mode. Operating in a non-zoning mode verse a zoning mode may including operating building equipment to operate based on a single set of environmental settings instead of operating each of multiple zones individually. During the software update process, zone controller 1006 can monitor (e.g., request and receive), software versions from the thermostat and/or secondary zone controller. In response to a version number of the thermostat and/or secondary zone controller matching a version number of a software version stored by zone controller as performed in step 1410, the zone controller 1006 can determine that the software update is complete (step 1412).

In step 1414, zone controller 1006 can determine whether a heating or cooling call is active. In response to the heating or cooling call being complete and/or otherwise ending, zone controller 1006 can operate in a zoning mode (step 1416). In the zoning mode, zone controller 1006 can control environmental conditions of multiple zones based on environmental conditions measured and/or individual settings for each zone.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for performing software updates for building devices of a building having a plurality of zones, the system comprising:
   a zone device associated with one of the plurality of zones;
   a controller communicably connected to the zone device and building equipment configured to control an environmental condition of the building, wherein the controller comprises a processing circuit and a memory device configured to store zone device software and controller software, the zone device software being a zone device operating system for the zone device and the controller software being a controller operating system for the controller, wherein the memory device is provisioned by a manufacturer during a manufacturing process with the zone device software and the controller software, wherein the processing circuit is configured to:
   execute the controller software;
   determine, by communicating with the zone device, whether second zone device software run on the zone device is newer or older than the zone device software stored in the memory device;
   update the second zone device software run on the zone device with the zone device software stored in the memory device in response to a determination that the second zone device software run on the zone device is older than the zone device software stored in the memory device;
   retrieve the second zone device software run by the zone device from the zone device in response to a determination that the second zone device software run on the zone device is newer than the zone device software stored in the memory device;
   store the second zone device software run by the zone device in the memory device to update the zone device software stored in the memory device and continue executing the controller software; and
   operate the building equipment to control the environmental condition of the building.

2. The system of claim 1, wherein the processing circuit of the controller is configured to determine, by communicating with the zone device, whether the second zone device software run on the zone device is newer or older than the zone device software stored in the memory device by:
   retrieving a second software version for the second zone device software run on the zone device from the zone device;
   comparing the second software version for the second zone device software run on the zone device to a first software version of the zone device software stored in the memory device;
   determining that the second zone device software run on the zone device is newer than the zone device software stored in the memory device in response to a determination that a second value of the second software version for the second zone device software run on the zone device is greater than a first value of the first software version of the zone device software stored in the memory device; and determining that the second zone device software run on the zone device is older than the zone device software stored in the memory device in response to a determination that the second value of the second software version for the second zone device software run on the zone device is less than the first value of the first software version of the zone device software stored in the memory device.

3. The system of claim 1, wherein the system further comprises a second zone device associated with another zone of the plurality of zones;

wherein the processing circuit of the controller is configured to:

determine, by communicating with the second zone device, whether third zone device software run on the second zone device is newer or older than the zone device software stored in the memory device; and update the third zone device software run on the second zone device in response to a determination that the third zone device software run on the second zone device is older than the zone device software stored in the memory device.

4. The system of claim 1, wherein the zone device comprises a network interface configured to communicate with a software update server and the processing circuit configured to:

receive, via the network interface, new zone device software from the software update server; and update the second zone device software run on the zone device with the new zone device software received from the software update server.

5. The system of claim 4, wherein the processing circuit of the zone device is configured to:

receive, via the network interface, new controller software for the controller from the software update server; and send the new controller software to the controller;

wherein the processing circuit of the controller is configured to:

receive the new controller software from the zone device; and update the controller software executed on the controller with the new controller software.

6. The system of claim 1, further comprising a second controller communicably coupled to the controller, wherein the second controller is configured to run second controller software;

wherein the processing circuit of the controller is configured to:

determine, by communicating with the second controller, whether the second controller software run on the second controller is newer or older than the controller software stored in the memory device; and update the second controller software run on the second controller with the controller software stored in the memory device in response to a determination that the second controller software run on the second controller is older than the controller software stored in the memory device.

7. The system of claim 6, wherein the processing circuit of the controller is configured to:

retrieve the second controller software run by the second controller from the second controller in response to a determination that the second controller software run on the second controller is newer than the controller software stored in the memory device; and store the second controller software run by the second controller in the memory device to update the controller software stored in the memory device.

8. The system of claim 1, wherein the processing circuit is configured to update the second zone device software run on the zone device by:

determining whether there is a call for heating or cooling active for the building equipment;

pausing a software update until the call for heating or cooling is complete;

operating the building equipment in a non-zone mode, wherein operating the building equipment in the non-zone mode causes the building equipment to control a particular environmental condition of each of the plurality of zones uniformly; and sending the zone device software stored in the memory device to the zone device.

9. The system of claim 8, wherein the processing circuit is configured to update the second zone device software run on the zone device by further:

determining whether the software update is complete by communicating with the zone device;

determining whether the call for heating or cooling is active for the system in response to a determination that the software update is complete; and operating the building equipment in a zone mode in response to a determination that the call for heating or cooling is complete, wherein operating the building equipment in the zone mode causes the building equipment to control the environmental condition of each of the plurality of zones based on an environmental setting associated with each of the plurality of zones.

10. The system of claim 1, wherein the system further comprises a plurality of zone devices, each of the plurality of zone devices associated with a zone of the plurality of zones;

wherein the processing circuit of the controller is configured to:

implement a communications bus, wherein the plurality of zone devices and the controller communicate on the communications bus;

receive control settings from the plurality of zone devices via the communications bus; and operate the building equipment to control the environmental condition of the building by communicating with the building equipment via the communications bus.

11. The system of claim 10, wherein the plurality of zone devices are zone thermostats.

12. A controller for performing software updates, wherein the controller comprises:

a processing circuit communicably coupled to a thermostat and building equipment of a building and a memory device configured to store thermostat software and controller software, the thermostat software being a thermostat operating system for the thermostat and the controller software being a controller operating system for the controller, wherein the memory device is provisioned by a manufacturer during a manufacturing process with the thermostat software and the controller software, wherein the processing circuit is configured to:

execute the controller software;

determine, by communicating with the thermostat, whether second thermostat software run on the thermostat is newer or older than the thermostat software stored in the memory device;

update the second thermostat software run on the thermostat with the thermostat software stored in the memory device in response to a determination that the second thermostat software run on the thermostat is older than the thermostat software stored in the memory device and continue executing the controller software;

retrieve the second thermostat software run by the thermostat from the thermostat in response to a determination that the second thermostat software run on the thermostat is newer than the thermostat software stored in the memory device;

store the second thermostat software run by the thermostat in the memory device to update the thermostat software stored in the memory device and continue executing the controller software; and operate the building equipment to control an environmental condition of the building.

13. The controller of claim 12, wherein the processing circuit is configured to determine, by communicating with the thermostat, whether the second thermostat software run on the thermostat is newer or older than the thermostat software stored in the memory device by:

retrieving a second software version for the second thermostat software run on the thermostat from the thermostat;

comparing the second software version for the second thermostat software run on the thermostat to a first software version of the thermostat software stored in the memory device;

determining that the second thermostat software run on the thermostat is newer than the thermostat software stored in the memory device in response to a determination that a second value of the second software version for the second thermostat software run on the thermostat is greater than a first value of the first software version of the thermostat software stored in the memory device; and determining that the second thermostat software run on the thermostat is older than the thermostat software stored in the memory device in response to a determination that the second value of the second software version for the second thermostat software run on the thermostat is less than the first value of the first software version of the thermostat software stored in the memory device.

14. The controller of claim 12, wherein the processing circuit of the controller is configured to:

retrieve the second thermostat software run by the thermostat from the thermostat in response to a determination that the second thermostat software run on the thermostat is newer than the thermostat software stored in the memory device; and store the second thermostat software run by the thermostat in the memory device to update the thermostat software stored in the memory device.

15. The controller of claim 14, wherein the processing circuit of the controller is configured to:

determine, by communicating with a second thermostat, whether third thermostat software run on the second thermostat is newer or older than the thermostat software stored in the memory device; and update the third thermostat software run on the second thermostat in response to a determination that the third thermostat software run on the second thermostat is older than the thermostat software stored in the memory device.

16. The controller of claim 12, wherein the processing circuit of the controller is configured to:

determine, by communicating with a second controller, whether second controller software run on the second controller is newer or older than the controller software stored in the memory device; and update the second controller software run on the second controller with the controller software stored in the memory device in response to a determination that the second controller software run on the second controller is older than the controller software stored in the memory device.

17. The controller of claim 16, wherein the processing circuit of the controller is configured to:

retrieve the second controller software run by the second controller from the second controller in response to a determination that the second controller software run on the second controller is newer than the controller software stored in the memory device; and store the second controller software run by the second controller in the memory device to update the controller software stored in the memory device.

18. The controller of claim 12, wherein the processing circuit is configured to update the second thermostat software run on the thermostat by:

determining whether there is a call for heating or cooling active for the building equipment;

pausing a software update until the call for heating or cooling is complete;

operating the building equipment in a non-zone mode, wherein operating the building equipment in the non-zone mode causes the building equipment to control one environmental condition of each of a plurality of zones of the building uniformly; and sending the thermostat software stored in the memory device to the thermostat.

19. The controller of claim 18, wherein the processing circuit is configured to update the second thermostat software run on the thermostat by further:

determining whether the software update is complete by communicating with the thermostat;

determining whether the call for heating or cooling is active for the controller in response to a determination that the software update is complete; and operating the building equipment in a zone mode in response to a determination that the call for heating or cooling is complete, wherein operating the building equipment in the zone mode causes the building equipment to control the environmental condition of each of the plurality of zones of the building based on an environmental setting associated with each of the plurality of zones.

20. A method for performing software updates, the method comprising:

storing, by one or more processing circuits of a controller, thermostat software and controller software in a memory device of the one or more processing circuits, the thermostat software being a thermostat operating system for a thermostat and the controller software being a controller operating system for the controller, wherein the memory device is provisioned by a manufacturer during a manufacturing process with the thermostat software and the controller software;

executing, by the one or more processing circuits, the controller software;

determining, by the one or more processing circuits of the controller by communicating with the thermostat, whether second thermostat software run on the thermostat is newer or older than the thermostat software stored in the memory device;

updating, by the one or more processing circuits of the controller, the second thermostat software run on the thermostat with the thermostat software stored in the memory device in response to a determination that the second thermostat software run on the thermostat is older than the thermostat software stored in the memory device;

retrieving, by the one or more processing circuits of the controller, the second thermostat software run by the thermostat from the thermostat in response to a determination that the second thermostat software run on the thermostat is newer than the thermostat software stored in the memory device;

storing, by the one or more processing circuits of the controller, the second thermostat software run by the thermostat in the memory device to update the thermostat software stored in the memory device and continue executing the controller software; and operating, by the one or more processing circuits of the controller, building equipment to control an environmental condition of a building.

21. The method of claim 20, further comprising:

determining, by the one or more processing circuits of the controller by communicating with a second thermostat, whether the second thermostat software run on the second thermostat is newer or older than the thermostat software stored in the memory device; and updating, by the one or more processing circuits of the controller, the second thermostat software run on the second thermostat in response to a determination that the second thermostat software run on the second thermostat is older than the thermostat software stored in the memory device.

22. The method of claim 20, determining, by the one or more processing circuits of the controller by communicating with the thermostat, whether the second thermostat software run on the thermostat is newer or older than the thermostat software stored in the memory device comprises:

retrieving a second software version for the second thermostat software run on the thermostat from the thermostat;

comparing the second software version for the second thermostat software run on the thermostat to a first software version of the thermostat software stored in the memory device;

determining that the second thermostat software run on the thermostat is newer than the thermostat software stored in the memory device in response to a determination that a second value of the second software version for the second thermostat software run on the thermostat is greater than a first value of the first software version of the thermostat software stored in the memory device; and determining that the second thermostat software run on the thermostat is older than the thermostat software stored in the memory device in response to a determination that the second value of the second software version for the second thermostat software run on the thermostat is less than the first value of the first software version of the thermostat software stored in the memory device.

* * * * *